(12) United States Patent
Zamponi

(10) Patent No.: US 6,800,099 B2
(45) Date of Patent: Oct. 5, 2004

(54) REACTIVE DYE MIXTURES

(75) Inventor: Andrea Maria Zamponi, Mannheim (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 145 days.

(21) Appl. No.: 10/022,069

(22) Filed: Dec. 17, 2001

(65) Prior Publication Data

US 2003/0019055 A1 Jan. 30, 2003

Related U.S. Application Data

(63) Continuation of application No. PCT/IB00/00902, filed on Jun. 21, 2000.

(51) Int. Cl.$^7$ .......................... D06P 1/382; D06P 1/384
(52) U.S. Cl. ............................................... 8/549; 8/641
(58) Field of Search ...................... 8/543–549, 638–641

(56) References Cited

U.S. PATENT DOCUMENTS

| | | | |
|---|---|---|---|
| 4,604,459 A | 8/1986 | Jager ........................... | 544/76 |
| 4,618,671 A | 10/1986 | Kayane et al. .............. | 534/635 |
| 4,705,524 A | 11/1987 | Hahnke et al. ................ | 8/527 |
| 4,841,031 A | 6/1989 | Kayane et al. .............. | 534/638 |
| 4,963,661 A | 10/1990 | Tappe et al. ................ | 534/642 |
| 5,003,049 A | 3/1991 | Bergmann et al. .......... | 534/618 |
| 5,004,807 A | 4/1991 | Pandl et al. ................ | 534/618 |
| 5,041,540 A | 8/1991 | Pandl et al. ................ | 534/618 |
| 5,093,484 A | 3/1992 | Herd .......................... | 534/642 |
| 5,095,102 A | 3/1992 | Herd et al. .................. | 534/638 |
| 5,352,246 A | 10/1994 | Hahnke et al. ................ | 8/638 |
| 5,445,654 A | 8/1995 | Hussong et al. .............. | 8/546 |
| 5,717,078 A | 2/1998 | Tzikas et al. ................ | 534/634 |
| 5,780,602 A | 7/1998 | Schumacher et al. ....... | 534/642 |
| 5,837,827 A | 11/1998 | Reichert et al. ............. | 534/618 |
| 5,849,887 A | 12/1998 | Lehmann et al. ............ | 534/642 |
| 5,931,974 A | 8/1999 | Pedemonte .................. | 8/546 |
| 5,944,854 A | 8/1999 | Schumacher et al. .......... | 8/549 |
| 6,015,439 A | 1/2000 | Pedemonte et al. ............ | 8/549 |
| 6,171,348 B1 | 1/2001 | Russ et al. ..................... | 8/549 |

FOREIGN PATENT DOCUMENTS

| | | |
|---|---|---|
| DE | 34 23 581 | 1/1986 |
| DE | 35 15 651 | 11/1986 |
| DE | 36 22 080 | 2/1987 |
| DE | 37 17 667 | 12/1988 |
| DE | 37 17 814 | 12/1988 |
| DE | 37 37 536 | 5/1989 |
| DE | 37 43 236 | 6/1989 |
| DE | 3825658 | 2/1990 |
| DE | 38 29 595 | 3/1990 |
| DE | 38 40 653 | 6/1990 |
| DE | 39 27 790 | 2/1991 |
| EP | 149 170 | * 7/1985 |
| EP | 224 224 | 6/1987 |
| EP | 343 262 | 11/1989 |
| EP | 531 968 | 3/1993 |
| EP | 600 322 | 6/1994 |
| EP | 668 328 | 8/1995 |
| EP | 679 697 | 11/1995 |
| EP | 761 768 | 3/1997 |
| EP | 773 264 | 5/1997 |
| EP | 776 947 | 6/1997 |
| EP | 827 987 | 3/1998 |
| EP | 832 939 | 4/1998 |
| EP | 870 807 | 10/1998 |
| EP | 976 794 | 2/2000 |
| EP | 982 374 | 3/2000 |
| WO | 98/49240 | 11/1998 |

* cited by examiner

*Primary Examiner*—Margaret Einsmann
(74) *Attorney, Agent, or Firm*—Connolly Bove Lodge & Hutz LLP

(57) ABSTRACT

A dye mixture comprises, as component (A), a reactive dye of the formula (A) wherein each of $Y^1$ and $Y^2$, independently, is a vinyl group or a group of the formula —$CH_2CH_2Q$ in which Q is a leaving group removable under alkaline conditions to provide a vinyl group; and, as component (B), at least one additional reactive dye selected from a monopyrazole dye of the formula (I), a mono or disazo dye of the formula (II), a monoazopyridone dye of the formula (III), a monoazonaphthyl dye of the formula (IV), a disazoaminonaphthyl dye of the formula (V), a formazan dye of the formula (VI), an azoacetoacetanalide dye of the formula (VII), a disazo dye of the formula (VIII), a naphthylamide or a naphthalenetriazole dye of the formula (IX), a metal phthalocyanine dye of the formula (X) or a triphendioxazine dye of the formula (XI), as defined herein.

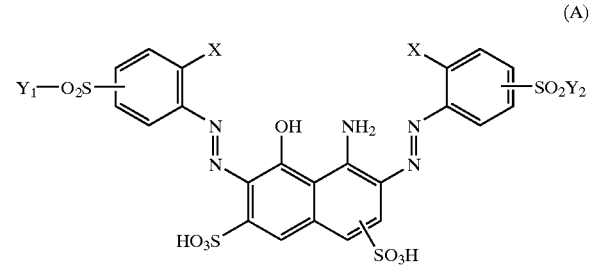

(A)

18 Claims, No Drawings

REACTIVE DYE MIXTURES

RELATED APPLICATIONS

This application is a continuation of PCT/IB00/00902, filed Jun. 21, 2000 and published as WO 01/00736. This application claims benefit to GB 9914837.1 filed Jun. 24, 1999 and GB 9929150.2 filed Dec. 9, 1999.

This invention relates to mixtures of reactive dyes, in particular to mixtures of reactive dyes containing, as one component, a disazo dye derived from H-acid.

As is well known, reactive dyes contain at least one substituent capable of taking part in a reaction with a group present on a fabric to be dyed during the dyeing operation.

EP-A-0149170 discloses a range of dyes of the formula

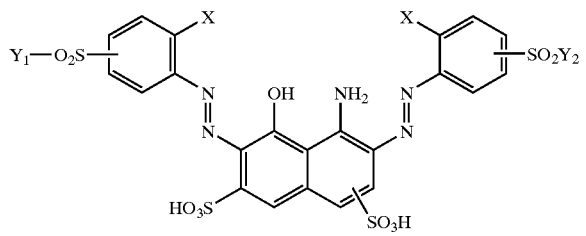

in which one X is hydrogen and the other sulpho, each of $Y_1$ and $Y_2$ independently is a group —CH=CH$_2$, —CH$_2$CH$_2$OSO$_3$H, —CH$_2$CH$_2$SSO$_3$H, —CH$_2$CH$_2$Cl or —CH$_2$CH$_2$OR, and R is a low molecular weight alkanoyl, benzoyl or benzenesulphonyl group, optionally substituted by a $C_{1-4}$ alkyl, $C_{1-4}$ alkoxy, halogen, carboxy or sulpho group.

A typical dye has the formula

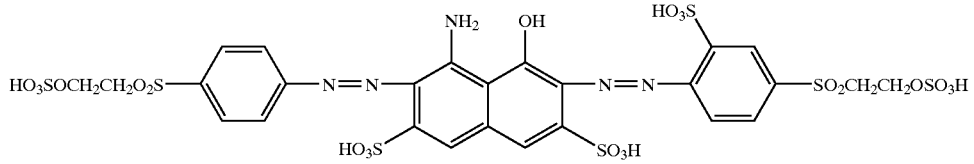

EP-A-0149170 refers only to individual dyes, not mixtures thereof.

On the other hand, each of EP-A-0224224, EP-A-0679697, EP-A-0531968, EP-A-0668328 and EP-A-0600322 discloses respective mixtures of dyes, one of which components is a disazo dye derived from H-acid. One particular example of such a dye has the formula

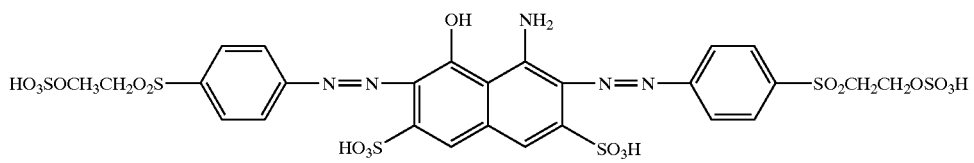

This dye is available commercially as C.I. Reactive Black 5 and is added to other dyes as a dulling agent where appropriate.

We find surprisingly that the fastness of a dye mixture can be improved if the dye mixture contains, as a component thereof, a dye of the formula (A)

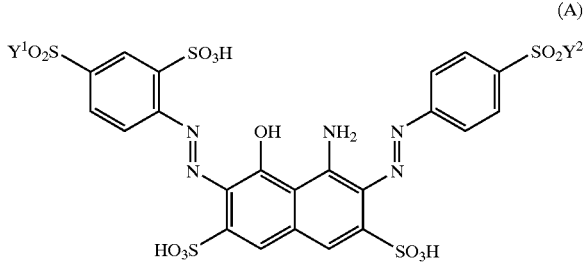

wherein each of $Y^1$ and $Y^2$, independently, is a vinyl group or a group of the formula —CH$_2$CH$_2$Q in which Q is a leaving group removable under alkaline conditions to provide a vinyl group.

The dye mixture may contain, in addition to component (A), any of a wide range of dyes.

More particularly, the present invention provides a dye mixture comprising a reactive dye of the formula (A), given and defined above; and
at least one reactive dye (B) selected from
(I) a monoazopyrazole dye of the formula

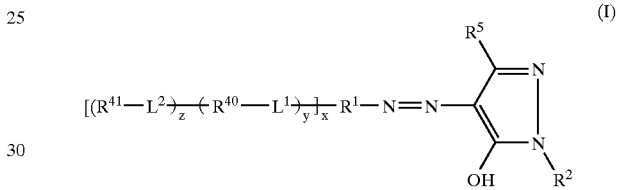

wherein $R^1$ is an aryl group selected from phenyl and naphthyl groups optionally having at least one substituent thereon, the substituents, or each substituent independently, being selected from a sulphonic acid group and a salt thereof, a $C_{1-4}$ alkyl group, a $C_{1-4}$ alkoxy group, a hydroxy group, a carboxyl group, a chlorine atom, a vinyl sulphonyl group and a group SO$_2$CH$_2$CH$_2$Q$^1$ in which Q$^1$ is a leaving group removable under alkaline conditions to provide a vinyl sulphonyl group;
$R^2$ is a phenyl or naphthyl group, optionally having a least one substituent thereon, the substituent, or each substituent, independently, being selected from a sulphonic acid group and a salt thereof, a $C_{1-4}$ alkyl group, a $C_{1-4}$ alkoxy group, a hydroxy group, a chlorine atom, a vinyl sulphonyl group, a group $SO_2CH_2CH_2Q^2$ in which $Q^2$ is a leaving group removable under alkaline conditions to provide a vinyl sulphonyl group, a group Het and a group $L^5$-Het, where Het is an optionally substituted aromatic heterocyclic reactive or non-reactive group or a reactive or non-reactive group having an aliphatic chain and $L^5$ is as defined below; and $R^6$ is a methyl group, an amide group or a carboxyl group or a salt thereof;

each of $R^{40}$ and $R^{41}$, independently, is an aryl group selected from phenyl and naphthyl groups, each of which, independently, is optionally substituted by a vinylsulphonyl group, a group $SO_2CH_2CH_2Q^1$ in which $Q^1$ is a leaving group removable under alkaline conditions to provide a vinylsulphonyl group; or the group Het, where Het is as defined above;

at least one of $R^1$, $R^2$, $R^{40}$ and $R^{41}$ being, or having thereon at least one substituent which is, reactive;

each of $L^1$, $L^2$ and $L^5$ independently is a linking group selected from $N(R^{20})$, in which $R^{20}$ is hydrogen or $C_{1-4}$ alkyl; $C(=O)$; $C(=O)$—O; $S(=O)_2$; $S(=O)$—NH; $C(=O)$—NH; and $NHC(=O)NH$; and each of x, y and z, independently, is zero or 1; and, when the group $R^1$ is substituted by a hydroxy group ortho to the azo group, a metallized derivative thereof;

(II) a monoazo or disazo dye of the formula

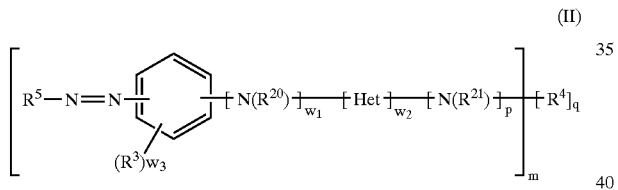

(II)

wherein:

Het is an optionally substituted aromatic heterocyclic reactive or non-reactive group or a reactive or non-reactive group having an aliphatic chain;

$R^3$ or each $R^3$, independently, is a chlorine atom, a methyl group, a methoxy group, a sulphonic acid group or a salt thereof, or is an amino, group of the formula

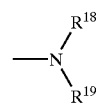

in which each of $R^{18}$ and $R^{19}$, independently, is hydrogen, chloro, methyl, ($C_{1-4}$ alkyl) carbonyl, aminocarbonyl, vinylsulphonyl or a group $SO_2CH_2CH_2Q^1$, in which $Q^1$ is as defined above;

$R^4$, or each $R^4$ independently, is hydrogen, a sulphonic acid group or a salt thereof, a $C_{1-8}$ alkyl (preferably a $C_{1-4}$ alkyl) group, a $C_{1-4}$ alkoxy group, a vinyl sulphonyl group or a group $SO_2CH_2CH_2Q^2$ in which $Q^2$ is a leaving group removable under alkaline conditions to provide a vinyl sulphonyl group, which $C_{1-4}$ alkyl group or $C_{1-4}$ alkyl moiety of the $C_{1-4}$ alkoxy group is optionally interrupted by an oxygen atom to provide an ether group and is optionally substituted by a vinyl sulphonyl group or a group $SO_2CH_2CH_2Q^2$, in which $Q^2$ is as defined above; or $R^4$ (or when q is 2, each $R^4$ independently) is a phenyl group optitonally substituted by at least one sulphonic acid group or a salt thereof or at least one group Het, where Het is as defined above; or $R^4$ is a group Het, where Het is as defined above $R^5$ is an aryl group selected from phenyl and naphthyl groups each optionally substituted by at least one sulphonic acid group or, a salt thereof or at least one group Het, as defined above;

$R^{20}$ is a hydrogen atom or a $C_{1-4}$ alkyl group;

$R^{21}$ is a hydrogen atom, a $C_{1-4}$ alkyl group, a sulphonic acid-$C_{1-4}$ alkyl group, a chloroalkylsulphonyl-$C_{1-4}$ alkyl group or a group Het, where Het is as defined above;

m is 1 or 2;

p is zero, 1 or 2;

q is zero, 1 or 2;

each of $w_1$ and $w_2$ is zero or 1; and $w_3$ is 1, 2 or 3; and when p is zero, q is zero;

at least one of $R^4$, $R^5$, $R^{18}$, $R^{19}$, $R^{21}$ and Het being, or having thereon at least one substituent which is, reactive;

(III) a monoazopyridone dye of the formula

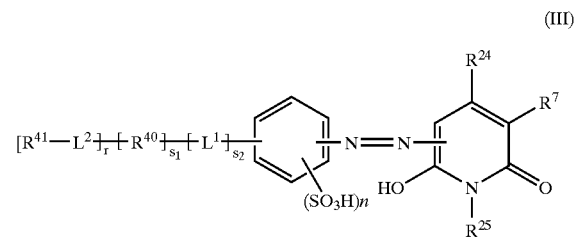

(III)

wherein:

each of $R^{40}$, $R^{41}$, $L^1$ and $L^2$ is as defined above;

$R^7$ is optionally present and is a cyano group or the group —$CH_2SO_3H$ or the group —$C(=O)NH_2$;

each of $R^{24}$ and $R^{25}$, independently, is a hydrogen atom, a $C_{1-4}$ alkyl group, a sulpho-$C_{1-4}$ alkyl group, or a carboxyl group;

n is 1 or 2;

r is zero or 1; and each of $s_1$ and $s_2$ is zero or 1; and when $R^{40}$ is a phenyl or naphthyl group $s_2$ is 1;

at least one of $R^{40}$ and $R^{41}$ being, or having thereon at least one substituent which is, reactive;

(IV) a monoazonaphthyl dye of the formula

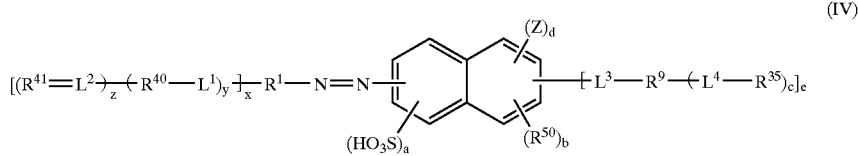

(IV)

wherein:
each of $R^1, R^{40}, R^{41}, L^1, L^2$, x, y and z is as defined above;
$R^9$ is $CH_3(C=O)-$, Het (as defined above) or an aryl group selected from phenyl and naphthyl, which Het or aryl group is optionally substituted by at least one substituent, the or each substituent, independently, being selected from a sulphonic acid group and a salt thereof, a $C_{1-4}$ alkyl group, a $C_{1-4}$ alkoxy group, a hydroxy group, an amino group optionally substituted by at least one methyl or sulphato group, a vinyl sulphonyl group and a group $SO_2CH_2CH_2Q^1$ in which $Q^1$ is as defined above;

$R^{35}$ is a $C_{1-4}$ alkyl or $C_{2-4}$ alkenyl group, which $C_{1-4}$ alkyl or $C_{2-4}$ alkenyl group is optionally substituted by at least one halogen atom, a sulphonic acid group or salt thereof, a chloroalkylsulphonyl group, a vinylsulphonyl group or $-SO_2CH_2CH_2Q^1$, where $Q^1$ is as defined above and which $C_{1-4}$ alkyl or $C_{2-4}$ alkenyl group optionally additionally contains at least one oxygen or sulphur atom in the chain thereof; the group Het (as defined above); or an aryl group selected from phenyl and naphthyl, which Het or aryl group is optionally substituted by at least one substituent, the substituent or each substituent independently, being selected from a sulphonic acid group and a salt thereof, a $C_{1-4}$ alkyl group, a $C_{1-4}$ alkoxy group, a halogen atom, a hydroxy group, an amino group optionally substituted by at least one methyl or sulphato group, a vinylsulphonyl group, a vinylsulphonyloxyethyl group and a group $SO_2CH_2CH_2Q^1$ in which $Q^1$ is as defined above;
$R^{50}$ is a vinylsulphonyl group or a group $SO_2CH_2CH_2Q^1$ (in which $Q^1$ is as defined above);
at least one of $R^1, R^9, R^{35}, R^{40}, R^{41}$ and $R^{50}$ is, or has thereon at least one substituent which is, reactive;
$L^3$ is a linking group selected from $N(R^{20})$, in which $R^{20}$ is as defined above; CO; COO; NHCO; NHCOM; $SO_2NH$ and $SO_2$;
$L^4$ is a linking group selected from $N(R^{21})$, in which $R^{21}$ is as defined above, CO, COO, NHCO, NHCONH, $SO_2N$ and $SO_2$;

Z is hydroxy, amino or methylamino;
a is zero or 1–4;
b is zero or 1–3;
c is zero or 1;
d is zero, 1 or 2;
e is zero or 1; and
when each of $R^1$ and Z provides a hydroxyl group ortho to the azo group, a metallized derivative thereof;

(V) a disazoaminonaphthyl dye of the formula

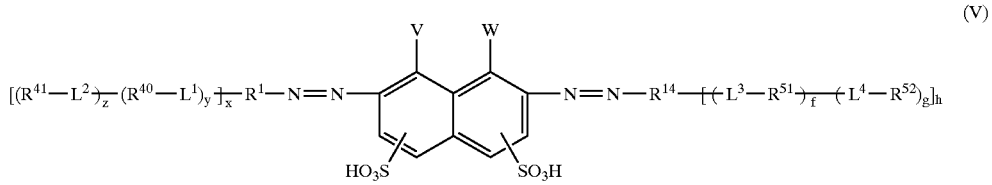

(V)

wherein:
each of $R^1, R^{40}, R^{41}, L^1, L^2$, x, y and z is as defined above;
each of V and W, independently, is $NH_2$ or OH;
$R^{14}$ is an aryl group selected from phenyl and naphthyl groups optionally having at least one substituent thereon, the substituents, or each substituent independently, being selected from a sulphonic acid group and a salt thereof, a $C_{1-4}$ alkyl group, a $C_{1-4}$ alkoxy group, a hydroxy group, a vinyl sulphonyl group, a group $SO_2CH_2CH_2Q^1$ in which $Q^1$ is a leaving group removable under alkaline conditions to provide a vinyl sulphonyl group;
each of $R^{51}$ and $R^{52}$ independently is an aryl group selected from phenyl and naphthyl groups each of which is optionally substituted by a vinyl sulphonyl group, a group $SO_2CH_2CH_2Q^1$ in which $Q^1$ is a leaving group removable under alkaline conditions to provide a vinyl sulphonyl group, or the group $Het^3$, where $Het^3$ is an optionally substituted aromatic heterocyclic reactive group or a reactive group having an aliphatic chain;
each of $L^3$ and $L^4$, independently, is a linking group selected from $N(R^{20})$, in which $R^{20}$ is hydrogen or $C_{1-4}$ alkyl; $C(=O)$; $C(=O)-O$; $S(=O)_2$; $S(=O)-NH$; $C(=O)-NH$; and $NHC(=O)NH$;
each of f, g and h, independently is zero or 1; and
at least one of $R^{14}, R^{40}, R^{41}, R^{51}$ and $R^{52}$ is, or has thereon at least one substituent which is, reactive;

(VI) a formazan dye of the formula

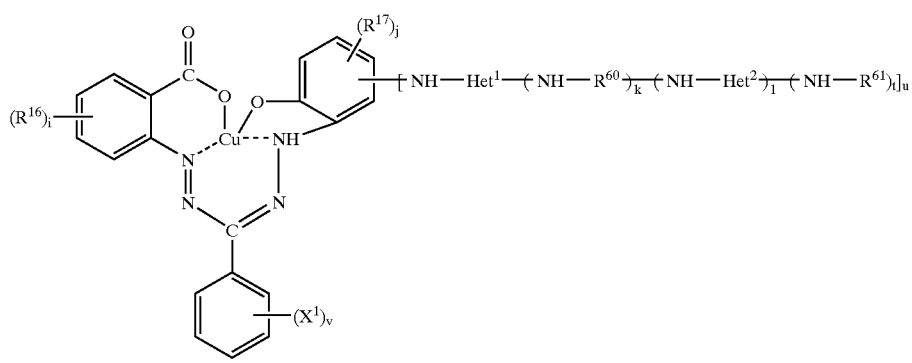

wherein:
- each of $R^{16}$ and $R^{17}$ independently of one another, each $R^{16}$ independently of one another and each $R^{17}$ independently of one another, is a sulphonic acid group or a salt thereof, a vinyl sulphonyl group or a group $SO_2CH_2CH_2Q^1$ in which $Q^1$ is a leaving group removable under alkaline conditions to provide a vinyl sulphonyl group;
- each of $Het^1$ and $Het^2$, independently, is an optionally substituted aromatic heterocyclic reactive or non-reactive group or a reactive or non-reactive group having an aliphatic chain; and
- each of $R^{60}$ and $R^{61}$, independently, is an aryl group selected from phenyl and naphthyl groups each of which is optionally substituted by a sulphonic acid group or a salt thereof, a vinylsulphonyl group or a group $SO_2CH_2CH_2Q^1$ in which $Q^1$ is as defined above;
- $X^1$ is a sulphonic acid group or a salt thereof or halogen;
- each of i, j and v, independently, is zero, 1 or 2; and
- each of k, l, t and u, independently, is zero or 1; and
- at least one of $R^{16}$, $R^{17}$, $R^{50}$, $R^{51}$, $Het^1$ and $Het^2$ is, or has thereon at least one substituent which is, reactive;

(VII) a dye of the formula

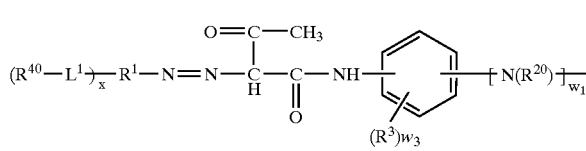

wherein:
- each of $R^1$, $R^2$, $R^3$, $R^4$, $R^{20}$, $R^{21}$, $R^{40}$, $L^1$, Het, x, p, q, $w_1$, $w_2$ and $w_3$ is as defined above; and
- at least one of $R^1$, $R^2$, $R^3$ $R^4$ $R^{21}$, $R^{40}$ and Het is, or has thereon at least one substituent which is, reactive;

(VIII) a disazo dye of the formula

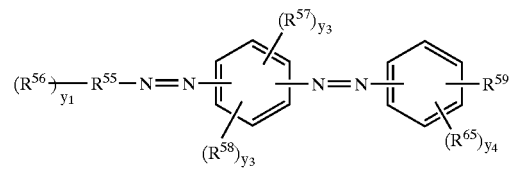

wherein $R^{55}$ is an aryl group selected from phenyl and naphthyl groups;

$R^{56}$ is a sulphonic acid group or a salt thereof or a reactive group selected from a vinyl sulphonyl group and a group $SO_2CH_2CH_2Q^1$ in which $Q^1$ is a leaving group removable under alkaline conditions to provide a vinyl sulphonyl group;

$R^{57}$ is an amino group or a group $NHR^A$ in which $R^A$ is a $C_{1-4}$ alkyl group;

$R^{58}$ is a sulphonic acid group or a salt thereof;

$R^{59}$ is a sulphonic acid group or a salt thereof, a reactive group selected from a vinyl sulphonyl group and a group $SO_2CH_2CH_2Q^2$ in which $Q^2$ is a leaving group removable under alkaline conditions to provide a vinyl sulphonyl group; or the group $R^{59}$ is a group Het or a group $L^{10}$-Het, where Het is an optionally substituted aromatic heterocyclic reactive or non-reactive group;

$R^{65}$ is a ureido group or a group $HNC(=O)R^B$ in which $R^B$ is a $C_{1-4}$ alkyl group;

$L^{10}$ is a linking group selected from $N(R^{20})$, in which $R^{20}$ is hydrogen or $C_{1-4}$ alkyl; $C(=O)$; $C(=O)—O$; $S(=O)_2$; $S(=O)—NH$; $C(=O)—NH$; and $NHC(=O)$ NH;

$y_1$ is zero, 1, 2 or 3;

$y_2$ is zero, 1 or 2;

$y_3$ is zero or 1; and $y_4$ is zero or 1; and at least one of $R^{56}$ and 59 is a reactive group.

(IX) a dye of the formula

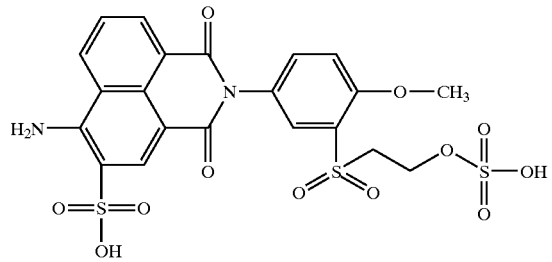

(33)

or

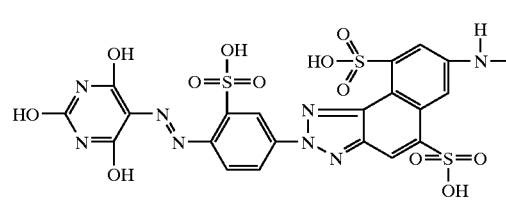

(39)

(X) a metal phthalocyanine dye of the formula

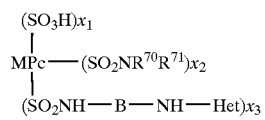

(X)

wherein:

MPc is a metallophthalocyanine chromophore;

each of $R^{70}$ and $R^{71}$ independently, is hydrogen or $C_{1-4}$ alkyl;

B is a hydrocarbon bridging group;

Het is a reactive heterocyclic group;

each of $x_1$, $x_2$ and $x_3$ is a respective average value;

$x_1 + x_2 + x_3 = 4$;

$x_1$ is at least 1

$x_2$ is zero or 1; and $x_3$ is at least 1; and (XI) a triphenodioxazine dye of the formula (XI) (or a salt thereof)

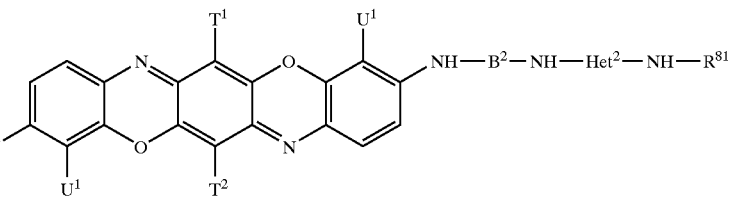

(XI)

wherein:

each of $B^1$ and $B^2$, independently, is a hydrocarbon bridging group;

$U^1$ is H or $SO_3H$; and each of $T^1$ and $T^2$, independently, is halo, $C_{1-4}$ alkyl, or $C_{1-4}$ alkoxy;

each of $R^{80}$ and $R^{81}$ is a phenyl group substituted by at least one sulphonic acid group or a salt thereof;

each of $Het^1$ and $Het^2$ is as defined above; and at least one of $Het^1$ and $Het^2$ is a reactive group.

Referring to the dye of the formula (A), preferably at least one of $Y^1$ and $Y^2$ is the group $—CH_2CH_2Q$ and Q is selected from chlorine, bromine, $C_{1-4}$-alkylsulfonyl, phenylsulfonyl, $OSO_3H$, $SSO_3H$, $OP(O)(OH)_2$, $C_{1-4}$-alkylsulfonyloxy, phenylsulfonyloxy, ($C_{1-4}$ alkyl) carbonyloxy, ($C_{1-4}$ dialkyl) amino or a radical of the formula

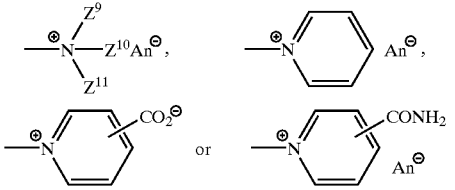

where $Z^9$, $Z^{10}$ and $Z^{11}$ are identical or different and are each, independently of one another, $C_{1-4}$ alkyl or benzyl and $An^\ominus$ is in each case one equivalent of an anion. More preferably, each of $Y^1$ and $Y^2$ is the group $HO_3SOCH_2CH_2$.

Referring now to the reactive dye (B), dyes in one preferred range thereof contain a group Het, where Het is an optionally substituted aromatic heterocyclic reactive around derived from a halogen-substituted heterocyclic compound selected from 1,3,5-triazine, quinoxaline, phthalazine, pyrimidine, pyridiazine and 2-($C_{1-4}$ alkylsulphonyl) benzothiazole. More preferably, the aromatic heterocyclic reactive group is substituted and at least one substituent is a halogen atom.

An alternative preferred range of reactive dyes (B) contains a group Het, where Het is a reactive group having an aliphatic chain and selected from acryloyl, mono-, di- or trichloroacryloyl, mono-, di- or tri-bromoacryloyl, —CO—CCl=CH—COOH, —CO—CH=CCl—COOH, 2-chloropropionyl, 1,2-dichloropropionyl, 1,2-dibromopropionyl, 3-phenylsulfonylpropionyl, 3-methylsulfonylpropionyl, 2-sulfatoethylaminosulfonyl, 2-chloro-2,3,3-trifluorocyclobutylcarbonyl, 2,2,3,3-tetrafluorocyclobutylcarbonyl, 2,2,3,3-tetrafluorocyclobutylsulfonyl, 2-(2,2,3,3-tetrafluorocyclobutyl)acryloyl, 1- or 2-alkyl- or 1- or 2-arylsulfonylacryloyl, or a radical of the formula $SO_2$—$Y^3$, $SO_2NH$—$Y^3$, $CONH$—$L^6$—$SO_2$—$Y^3$, or $NHCONH$—$L^6$—$SO_2$—$Y^3$ where $L^6$ is $C_1$-$C_4$-alkylene or phenylene and $Y^3$ is a vinyl group or a group of the formula $CH_2CH_2Q^3$ in which $Q^3$ is a leaving group removable under alkaline conditions to provide a vinyl group.

It is also preferred that, the reactive dye (B) has at least one of the groups $Q^1$ and $Q^2$ therein and the or each of groups $Q^1$ and $Q^2$ independently is selected from chlorine, bromine, $C_{1-4}$-alkylsulfonyl, phenylsulfonyl, $OSO_3H$, $SSO_3H$, $OP(O)(OH)_2$, $C_{1-4}$-alkylsulfonyloxy, phenylsulfonyloxy, ($C_{1-4}$ alkyl) carboxyloxy, ($C_{1-4}$ dialkyl) amino or a radical of the formula

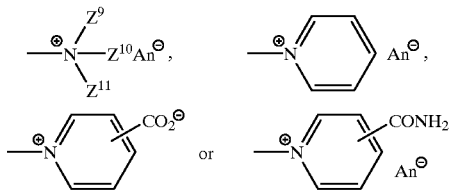

where $Z^9$, $Z^{10}$ and $Z^{11}$ are identical or different and are each, independently of one another, $C_{1-4}$-alkyl or benzyl and $An^\ominus$ is in each case one equivalent of an anion.

In a dye mixture wherein the reactive dye (B) is a monoazopyrazole dye of, the formula (I), given and defined above, it is preferred that at least one of the group $[(R^{41}$—$L^2)_z(R^{40}$—$L^1)_y]_xR^1$ and the group $R^2$ has at least one sulphonic acid group substituted thereon and at least the other of the group $[(R^{41}$—$L^2)_z(R^{40}$—$L^1)_y]_xR^1$ and the group $R^2$ has a group —$SO_2CH_2SO_2Q^2$ substituted thereon, $Q^2$ being as defined above.

In respective preferred ranges of the reactive dye (B) of the formula (I)

(i) x is zero and the group $R^1$ is substituted by at least one of a sulphonic acid group and the group —$SO_2CH_2SO_2Q^1$, wherein $Q^1$ is as defined above;

(ii) each of x, y and z is 1, each of $L^1$ and $L^2$ is NH, $R^{40}$ is the group Het, where Het is a triazine ring substituted by a halogen atom and $R^{41}$ is an optionally substituted phenyl group.

(iii) each of x and z is 1, y is zero, $L^2$ is NH and $R^{41}$ is the group Het, where Het is a difluorochloropyrimidinyl group; and (iv) each of x and z is 1, y is zero, $L^2$ is CONH (in which the nitrogen atom is attached to the group $R^1$ and the carbon to the group $R^{41}$) and $R^{41}$ is the group Het, where Het is a 2,3-dichloroquinoxaline group.

In a reactive dye (B) of the formula (I), $R^2$ is preferably a phenyl or naphthyl group substituted by (i) at least one of a sulphonic acid group and the group —$SO_2CH_2SO_2Q^2$, where $Q^2$ is as defined in claim 1; or (ii) at least by the group NH—Het, where Het is a is triazine ring substituted by a halogen atom and optionally substituted by the group

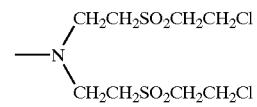

In a reactive dye (B) of the formula (I), the group $R^1$ may be substituted by a hydroxy group ortho to the azo group and the reactive dye (B) may then be in the form of a copper complex.

Reference is now made to a dye mixture wherein the reactive dye (B) is monoazo or disazo dye of the formula (II), given and defined above.

In such a mixture it is preferred that in the reactive dye (B) of the formula (II), when m is 1 and $R^4$ is alkyl, $R^4$ is $C_{1-4}$ alkyl.

It is also preferred that the group $R^5$ is an aryl group selected from phenyl and naphthyl groups each substituted by at least one sulphopic acid group or a salt thereof or by a group Het, wherein Het is a vinylsulphonyl group or a group $SO_2CH_2CH_2Q^1$ in which $Q^1$ is as defined above.

In an especially preferred reactive dye (B) of the formula (II), m is 1, so that the dye is a monoazo dye.

In preferred ranges of monoazo dyes (B) of the formula (II) in a mixture in accordance with the invention, (i) each of $w_1$, $w_2$, p and q is zero, $w_3$ is at least 2, at least one of the groups $R^3$ is a sulphonic acid group and the group $R^5$ is an aryl group selected from phenyl and naphthyl groups each substituted by a vinylsulphonyl group or a group —$SO_2CH_2CH_2Q^1$, where $Q^1$ is as defined above.

(ii) each of $w_1$ and $w_2$ is zero, each of p and q is 1, $R^{21}$ is hydrogen and $R^4$ is selected from a triazine ring substituted by at least one halogen atom and optionally additionally substituted by an amino group; and a pyrimidine group substituted by at least one halogen atom and optionally additionally substituted by a methyl group;

(iii) each of $w_1$, $w_2$, p and q is 1, $R^{20}$ is hydrogen, Het is a triazine ring substituted by a halogen atom, $R^{21}$ is hydrogen and $R^4$ is selected from a phenyl group or a group —$SO_2CH_2CH_2Q^1$, where $Q^1$ is as defined above, and a straight or branched $C_{2-4}$ alkylene chain substituted by a substituent selected from a hydroxyl group; a sulphonic acid group or salt thereof; a vinylsulphonyl group, a group —$SO_2CH_2CH_2Q^2$, where $Q^2$ is as defined above; and a pyrimidinylamino group in which the pyrimidinyl group is substituted by at least one halogen atom and optionally additionally by a methyl group; and which straight or branched $C_{2-4}$ alkylene group optionally contains a hetero atom selected from O, S and N(H);

(iv) each of $w_1$ and $w_2$ is zero, each of p and q is 1 and each of $R^{21}$ and $R^4$ is the group $OSO_3H$; and (v) $w_1$ is zero, $w_2$ is 1, p is 1, q is 1, $R^{21}$ is hydrogen, $R^4$ is a pyrimidinyl group substituted by at least one halogen atom and optionally additionally substituted by a methyl group and Het is a non-reactive heterocyclic group of the formula

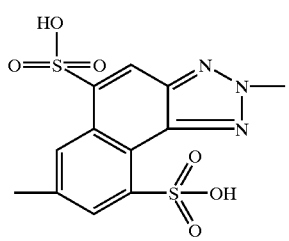

An especially preferred dye mixture contains a dye of the formula (44) as the reactive dye (B) of formula (II)

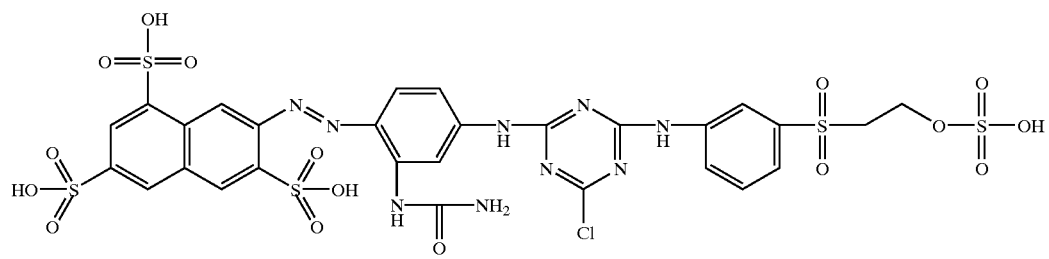

Reference is now made to a dye mixture wherein the reactive dye (B) is a monoazopyridone dye of the formula (III), given and defined above.

In respective preferred ranges of the reactive dye (B) of the formula (III), (i) each of r, $s_1$ and $s_2$ is 1, each of $L^1$ and $L^2$ is NH, $R^{40}$ is a triazine ring substituted by a halogen atom and $R^{41}$ is selected from a phenyl group substituted by at least one of a chlorine atom, a sulphonic acid group or a salt thereof, a vinylsulphonyl group or a group —$SO_2CH_2CH_2Q^1$, where $Q^1$ is as defined above; and a straight or branched chain $C_{2-4}$ alkylene group optionally containing at least one oxygen atom and substituted by a vinylsulphonyl group or a group —$SO_2CH_2CH_2Q^1$, where $Q^1$ is as defined above;

(ii) each of r and $s_1$ is 1, $s_2$ is zero, $L^2$ is NH, $R^{41}$ is a pyrimidinyl group substituted by at least one halogen atom and optionally additionally substituted by a methyl group and $R^{40}$ is a naphtho-(1,2-d)-1,2,3-triazole substituted by at least one sulphonic acid group or salt thereof; and (iii) each of $r_1$, $s_1$ and $s_2$ is 1, $L^1$ is CONH (in which the carbon atom is attached to the group $R^{40}$), $L^2$ is NH, $R^{40}$ is an optionally substituted phenyl group and $R^{41}$ is a pyrimidinyl group substituted by at least one halogen atom and optionally additionally substituted by a methyl group.

Reference is now made to a dye mixture wherein the reactive dye (B) is a monoazonaphthyl dye of the formula (IV), given and defined above.

In one preferred range of such dyes, (i) x is zero, d is 1 and a or b is 1. More preferably e is zero.

In other preferred respective ranges, (ii) x is 1, y is zero, z is 1, $L^2$ is NH and $R^{41}$ is a pyrimidinyl group substituted by at least one halogen atom and optionally additionally substituted by a methyl group;

(iii) x is 1, y is zero, z is 1, $L^2$ is CONH (with the carbon atom attached to the group $R^1$ and the nitrogen atom to the group $R^{41}$) and $R^{41}$ is a phenyl group substituted by a vinylsulphonyl group or a group —$SO_2CH_2CH_2Q^1$, where $Q^1$ is as defined above; and (iv) each of x, y and z is 1, each of $L^1$ and $L^2$ is NH, $R^{40}$ is a triazine ring substituted by a halogen atom and $R^{41}$ is an aromatic group selected from phenyl and naphthyl groups each substituted by at least one of a sulphonic acid group or a salt thereof, a vinylsulphonyl group and the group —$SO_2CH_2CH_2Q^1$, where $Q^1$ is as defined above.

In such ranges (ii)–(iv) of dyes (B) of the formula (IV), more preferably, e is zero.

In other preferred ranges of the reactive dye (B) of the formula (IV), (v) e is 1, c is zero, $L^3$ is CONH (where either the nitrogen or carbon atom thereof is attached to the group $R^9$) and $R^9$ is a methyl group;

(vi) e is 1, c is zero, $L^3$ is CONH (where either the nitrogen or carbon atom thereof is attached to the group $R^9$) and $R^9$ is a phenyl group optionally substituted by at least one substituent, the or each substituent being selected from methoxy, carboxyethyl, sulphoethyl, carboxyethenyl, 1,2-dibromoalkyl, chloroethylsulphonyl, vinylsulphonyl, a group of the formula —$SO_2CH_2CH_2Q^1$, where $Q^1$ is as defined above and a 2,3-dichloroquinoxaline group.

(vii) e is 1, c is 1, $L^3$ is CONH (where either the nitrogen or carbon atom thereof is attached to the group $R^9$), $R^9$ is a phenyl group substituted at least by the group $L^4$—$R^{35}$, where $L^4$ is NH and $R^{35}$ is a vinyl group optionally substituted by a halogen atom or a pyrimidinyl group substituted by a halogen atom and optionally additionally substituted by a methyl group; and (viii) e is 1, c is zero, $L^3$ is N($R^{20}$), where $R^{20}$ is as defined above (and is more preferably a hydrogen atom or a methyl group) and $R^9$ is a vinylsulphonyl group, a group —$SO_2CH_2CH_2Q^1$ wherein $Q^1$ is as defined in claim 1, or a pyrimidinyl group substituted by a halogen atom and optionally additionally substituted by a methyl group.

In yet another preferred range (ix) e is 1, c is zero, $L^3$ is N($R^{20}$), where $R^{20}$ is as defined above and $R^9$ is a triazine ring substituted by at least one halogen atom. In this range the triazine ring is preferably substituted by two halogen atoms or by one halogen atom and a morpholinyl group.

In another preferred range, (x) e is 1, c is 1, $L^3$ is $N(R^{20})$, where $R^{20}$ is as defined above, $L^4$ is the group $R^{21}$, where $R^{21}$ is as defined above, and $R^{35}$ is selected from a phenyl group optionally substituted by a sulphonic acid group or salt thereof, a halogen atom, a vinylsulphonyloxyalkyl group, a vinylsulphonyl group or the group —$SO_2CH_2CH_2Q^1$, where $Q^1$ is as defined above; and a $C_{1-4}$ alkyl group optionally substituted by a vinylsulphonyl group, the group —$SO_2CH_2CH_2Q^1$ where $Q^1$ is as defined above, a sulphonic acid group or a salt thereof or a chloroalkylsulphonyl group, which $C_{1-4}$ alkyl group optionally additionally contains at least one oxygen or sulphur atom in the chain thereof In dye mixtures containing a reactive dye (B) of the formula (IV) within the above ranges x is preferably zero.

In the reactive dye (B) of the formula (IV), each of the groups $R^1$ and the naphthalene nucleus may be substituted by a respective hydroxyl group ortho to the azo group and the reactive dye (B) may then be in the form of a copper complex thereof.

An especially preferred dye mixture contains a dye of the formula (53) as the reactive dye (B)

is NH, $R^{40}$ is a triazine ring substituted by a halogen atom and $R^{41}$ is a phenyl group substituted by at least one substituent, the or each substituent independently being selected from a sulphonic acid group or a salt thereof, a vinylsulphonyl group and a group $SO_2CH_2CH_2Q^1$, where $Q^1$ is as defined above.

In the preferred ranges (i) and (ii) above, more preferably, each of f, g and h is 1, each of $L^3$ and $L^4$ is NH, $R^{51}$ is a triazine ring substituted by a halogen atom and $R^{52}$ is a phenyl group substituted by at least one substituent the or each substituent independently being selected from a halogen atom, a sulphonic acid group or a salt thereof, a vinylsulphonyl group and a group $SO_2CH_2CH_2Q^1$, where $Q^1$ is as defined above.

In a preferred range (iii) of reactive dyes (B) of the formula (V), V is amino, W is hydroxy, h is zero and $R^{14}$ is a naphthaalene group substituted by at least one sulphonic acid group. More preferably, in this range (iii), each of x, y and z is 1, $R^1$ is a phenyl group optionally substituted by a sulphonic acid group or a salt thereof, each of $L^1$ and $L^2$ is NH, $R^{40}$ is a triazine ring substituted by a halogen atom and $R^{41}$ is a phenyl group substituted by at least one substituent,

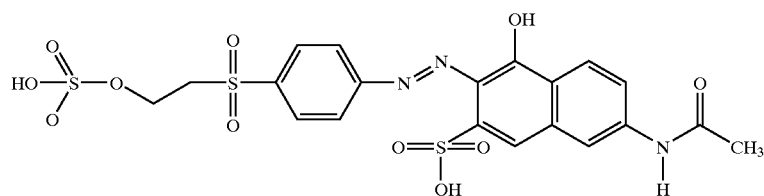

(53)

Reference is now made to a dye mixture wherein the reactive dye (B) is a disazo dye of the formula (V), given and defined above. In such dyes, the respective sulphonic acid groups on the naphthalene nucleus are preferably in the 3- and 6-positions (i.e. such dyes are preferably derived from H-acid).

In one preferred range of dyes of the formula (i) V is amino, W is hydroxy, each of $R^1$ and $R^{14}$ is a phenyl group substituted by at least one substituent, the or each substituent independently being selected from a sulphonic acid group or a salt thereof, a vinyl sulphonyl group and a group $SO_2CH_2CH_2Q^1$, where $Q^1$ is as defined above and $R^{14}$ is optionally additionally substituted by at least one methoxy group.

It is also preferred, especially for one sub-range within the range (i), that each of x and h is zero. Such a range of dyes includes those of the formula (A) and a mixture in accordance with the invention may indeed contain only dyes of the formula (A), one such dye of the mixture being regarded as a dye of the formula (A) and at least one other such dye of the mixture being regarded as a dye of the formula (V).

In an alternative preferred range of dyes of the formula (V), especially for another sub-range within the range (i), at least one of x and h is 1 and more preferably each of x and h is 1.

In a preferred sub-range (ii) of dyes (B) of the formula (V), within the range (i), x, y and z is 1, each of $L^1$ and $L^2$ the or each substituent independently being selected from a sulphonic acid group or a salt thereof, a vinylsulphonyl group and a group $SO_2CH_2CH_2Q^1$, where $Q^1$ is as defined above.

In a preferred range (iv) of the reactive dyes (B) of the formula (V), V is amino, W is hydroxy, h is 1, f is zero, g is 1, $L^4$ is NH and $R^{52}$ is the group $Het^3$, where $Het^3$ is a substituted aromatic heterocyclic group. In this range (iv), more preferably the group $Het^3$ is a pyrimidinyl group substituted by at least one halogen atom and optionally additionally substituted by a methyl group and still more preferably x is zero and $R^1$ is a phenyl group substituted by a vinylsulphonyl group or $SO_2CH_2CH_2Q^1$, where $Q^1$ is as defined above.

In a preferred range (v) of the reactive dyes (B) of the formula (V), V is amino, W is hydroxy, h is 1, f is zero, g is 1, $L^4$ is NHCO (where either the nitrogen or carbon atom thereof is attached to the group $R^{14}$) and $R^{52}$ is the group $Het^3$, where $Het^3$ is a reactive group having an aliphatic chain. More preferably, in this range (v), the group $Het^3$ is a vinylsulphonyl group or $SO_2CH_2CH_2Q^1$, where $Q^1$ is as defined above and still more preferably x is zero and $R^1$ is a phenyl group substituted by a vinylsulphonyl group or $SO_2CH_2CH_2Q_1$, where $Q^1$ is as defined above.

One especially preferred dye mixture contains a dye of the formula (105) as a dye of the formula (V)
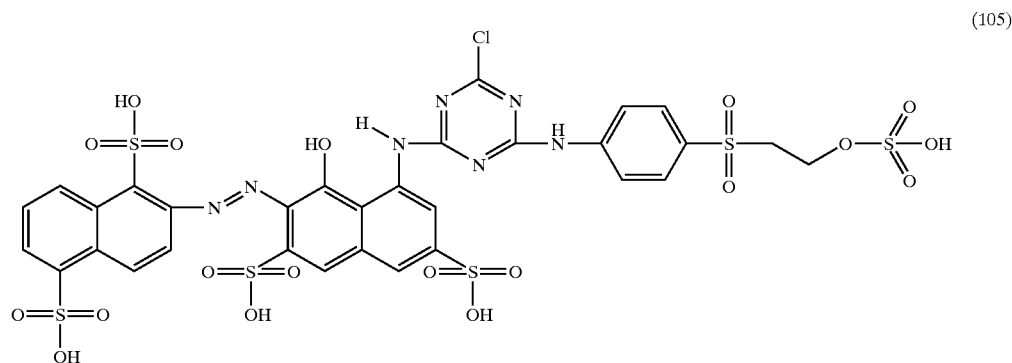
(105)
and more preferably additionally contains a dye of the formula (44) as another dye (B), of the formula (II)
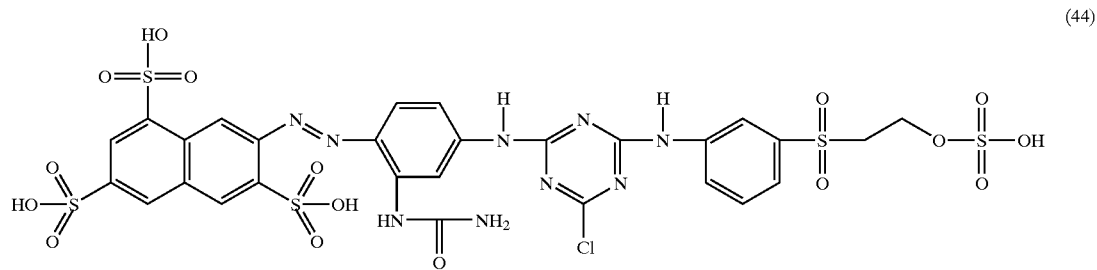
(44)
Another especially preferred dye mixture contains at least one and more preferably both of the dyes of the formulae (163) and (167)
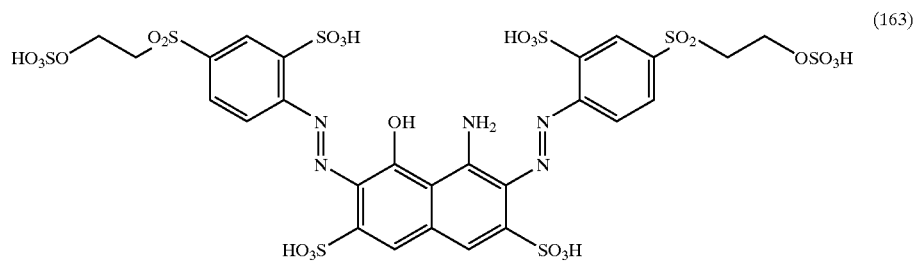
(163)
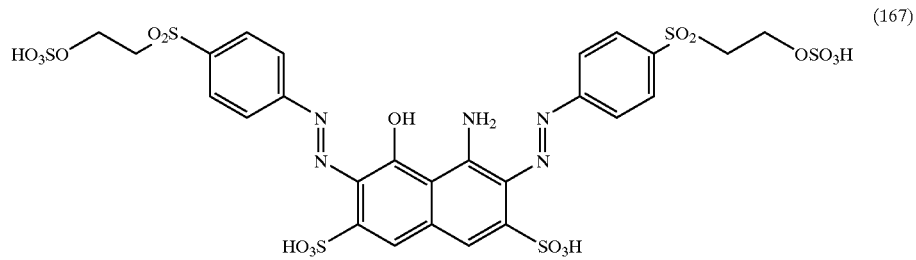
(167)

Reference is now made to a dye mixture wherein the reactive dye (B) is a formazan dye of the formula (VI), given and defined above.

In preferred respective ranges of the reactive dye (B) of the formula (VI)

(i) each of u and v is zero, i is 1, $R^{16}$ is a sulphonic acid group or a salt thereof, j is 2 and one $R^{17}$ is a sulphonic acid group or a salt thereof and the other $R^{17}$ is a vinylsulphonyl group or $SO_2CH_2CH_2Q^1$, where $Q^1$ is as defined above; and (ii) v is zero, i is 1, $R^{16}$ is a sulphonic acid group or a salt thereof, j is 1, $R^{17}$ is a sulphonic acid group, u is 1 and $Het^1$ is a triazine ring substituted by a halogen atom. In one preferred sub-range within the range (ii), each of k and l is zero, t is 1 and $R^{61}$ is a phenyl group substituted by at least one sulphonic acid group or a salt thereof, while in another preferred sub-range with the range (ii), each of k, l and t is 1, each of $R^{60}$ and $R^{61}$ independently is a phenyl group substituted by at least one sulphonic acid group or a salt thereof and $Het^2$ is a triazine ring substituted by a halogen atom. In yet another preferred sub-range within the range (ii), each of k and t is zero, l is 1 and $Het^2$ is a reactive group having an aliphatic chain.

Reference is now made to a dye mixture wherein the reactive dye (B) is a dye of the formula (VII), given and defined above.

In one preferred range of such dyes, x is zero and each of p, q, w and $w_2$ is 1. More preferably, in such a range, $R^1$ is a naphthalene ring substituted by at least one sulphonic acid group. It is also preferred that, in such a range, $w_3$ is 1 and $R^3$ is a methoxy group. Moreover, a preferred group of $R^{20}$ is hydrogen and preferred groups of $R^{21}$ are hydrogen, methyl and ethyl. A preferred group $R^4$ is a phenyl group substituted by at least one sulphonic acid group.

In another preferred range of such dyes (VII), each of p, q, $w_1$ and $w_2$ is zero. More preferably, in such a range, $w_3$ is 3 and at least one of $R^3$ is a sulphonic acid group. Other groups of $R^3$ are preferably methyl, methoxy, amino or further sulphonic acid groups. It is also preferred that where, in such dyes, x is 1, $R^1$ is a phenyl or naphthyl group substituted by at least one sulphonic acid group, $L^1$ is NH and $R^{40}$ is a reactive halopyrimidine group, especially a group containing at least one, more especially at least two fluorine atoms and particularly a difluorochloropyrimidine group, and that where, in such dyes x is zero, $R^1$ is a phenyl groups substituted by a vinyl sulphonyl group or $SO_2CH_2CH_2Q^1$, where $Q^1$ is as defined above and optionally additionally substituted by at least one methoxy group.

Reference is now made to a dye mixture wherein the reactive dye (B) is a disazo dye of the formula (VIII), given and defined above.

In one preferred range of such dyes, $R^{55}$ is a naphthyl group;

$R^{56}$ is a sulphonic acid group or a salt thereof;

$R^{59}$ is a group $L^{10}$—Het, where $L^{10}$ is the group N(H)— and Het is a reactive heterocyclic group substituted by at least one halogen atom;

$y_1$ is 1, 2 or 3; and each of $y_2$, $y_3$ and $y_4$ is zero.

A particularly preferred such disazo dye of the formula (VIII) in a dye mixture embodying the invention has the formula

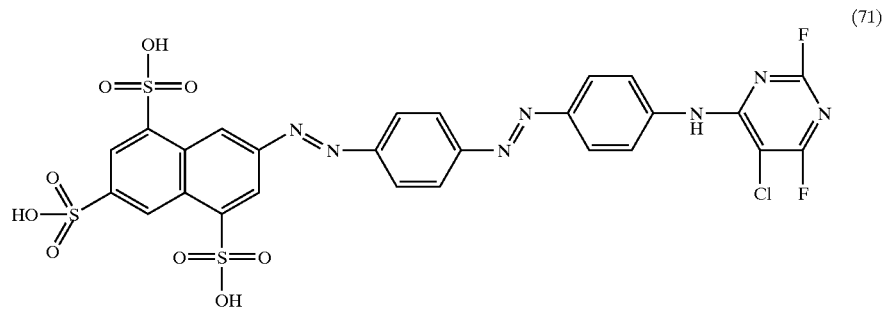

(71)

In another preferred range of such dyes of the formula (VIII)

$R^{55}$ is a phenyl group;

the group $R^{56}$ or each group $R^{56}$ independently is a sulphonic acid group or a salt thereof or is a reactive group selected from a vinyl sulphonyl group and a group $SO_2CH_2CH_2Q^2$ in which $Q^2$ is as defined above;

$y_1$ is 1 or 2; and at least one group $R^{56}$ is a said reactive group or the group $R^{59}$ is or includes a reactive group.

More preferably, at least one group $R^{56}$ or the group $R^{59}$ is a reactive group selected from a vinyl sulphonyl group and a group $SO_2CH_2CH_2Q^2$ in which $Q^2$ is as defined above; or at least one group $R^{56}$ is a sulphonic acid group or a salt thereof and $R^{59}$ is the group $L^{10}$—Het, where $L^{10}$ is the group N(H)— and Het is a reactive triazine group substituted by a halogen atom and additionally by the group $NHCH_2CH_2SO_3H$.

Especially preferred dyes have the formulae

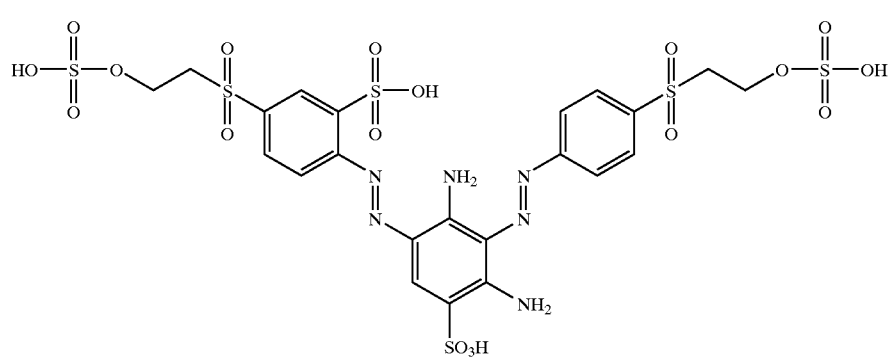
(85A)

and

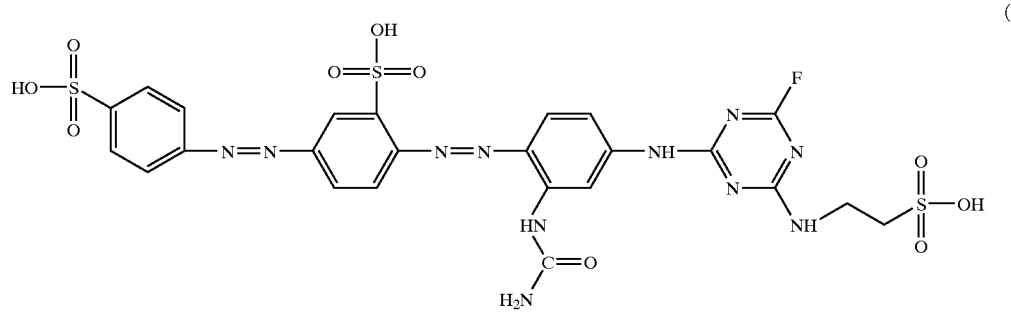
(85B)

Reference is now made to a dye mixture wherein the reactive dye (B) is a phthalocyanine dye of the formula (X), given and defined above.

Preferably, in the reactive dye (B) of the formula (X), respective average values of $x_1$, $x_2$ and $x_3$ are $x_1$ is 3, $x_2$ is zero and $x_3$ as 1, three of the four isoindole rings of the phthalocyanine have a respective sulphonic acid substituent (or a salt thereof) thereon and the other isoindole ring has a group $SO_2NH$—B—NH—Het substituted thereon. More preferably B is a straight or branched $C_{2-4}$ alkylene group and Het is a triazine ring substituted by at least one halogen atom and optionally additionally substituted by a methoxy group.

Reference is now made to a dye mixture wherein the reactive dye (B) is a triphendioxazine dye of the formula (XI), given and defined above, or a salt thereof.

Preferably, in such a reactive dye (B) of the formula (XI), each of $T^1$ and $T^2$ is a halogen atom, each $U^1$ is a sulphonic acid group or a salt thereof, each of $B^1$ and $B^2$ independently is a straight or branched $C_{2-4}$ alkylene group, each of $Het^1$ and $Het^2$ independently is a triazine ring substituted by a halogen atom and each of $R^{80}$ and $R^{81}$ independently is a phenyl group substituted by at least one sulphonic acid group or a salt thereof.

The dyes of the formula (A) can be prepared by diazotising each of the amines (XX) and (XXI)

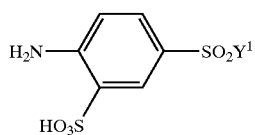
(XX)

and

-continued

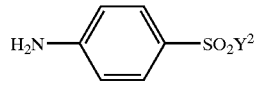
(XXI)

wherein each of $Y^1$ and $Y^2$ is as defined above and firstly coupling the diazotised amine (XXI) under strongly acid conditions (pH 1–2) to H-acid to provide an azo group ortho to the amine group and thereafter coupling the diazotised amine (XX) under slightly acidic, neutral or alkaline conditions (pH 6–7) to the H-acid to provide an azo group ortho to the hydroxy group.

The diazotisation reactions may each be carried out by adjusting the pH of the amine with a buffer to about 5.3–6, adding an aqueous solution of hydrochloric acid and ice to cool to 0–5° C. and then adding a sodium nitrite solution.

The coupling reactions may each be carried out by adjusting the pH as described above and allowing reaction to take place at a temperature of from 4 to 8° C. for at least 3 hours.

These and other methods of preparing the dyes of the formula (A) are described in EP-A-0149170.

Likewise disazo dyes (B) of the formula (V) may be prepared in an analogous manner. Methods of preparation of such dyes are also disclosed in DE-A-3825658 and DE-A-3622080.

Dyes (B) of the formula (I) may be prepared by the methods disclosed in DE-A-3717667.

Dyes (B) of the formula (II) may be prepared by the method disclosed in DE-A-3927790, DE-A-3515651 and EP-A-0761768.

Dyes (B) of the formula (III) may be prepared by the methods disclosed in U.S. Pat. No. 4,618,671, DE-A-3717814 and DE-A-3829595.

Dyes (B) of the formula (IV) may be prepared by the method disclosed in U.S. Pat. No. 4,841,031, EP-A-0343262 and EP-B-0776947.

Dyes (B) of the formula (VI) may be prepared by the methods disclosed in DE-A-3737536, DE-A-3743236 and DE-A-3840653.

Dyes (B) of the formula (X) may be prepared by the methods disclosed in WO-A-98/49240.

Dyes (B) of the formula (XI) may be prepared by the methods disclosed in DE-A-3423581 and EP-A-0773264.

Examples of dyes (B) of the formula (VII) are CI Reactive Yellow 57, CI Reactive Yellow 106, CI Reactive Yellow 160 and CI Reactive Yellow 167, all commercially available.

A preferred dye mixture in accordance with the invention comprises, by weight of the total weight of the dyes, from 10–99.5% by weight, inclusive of component (A), given and defined above, and from 0.5 to 90% by weight inclusive of component (B), given and defined above. Respective progressively more preferred ranges are as follows:

- 10–99% by weight, inclusive of component (A) and from 1 to 90% by weight, inclusive of component (B);
- from 10–98.5% by weight, inclusive, of component (A) and from 1.5–90% by weight, inclusive, of component (B);
- from 10–97% by weight, inclusive, of component (A) and from 3–90% by weight, inclusive, of component (B);
- from 10–95% by weight, inclusive, of component (A) and from 5–90% by weight, inclusive, of component (B);
- from 10–90% by weight, inclusive, of component (A) and from 10–90% by weight, inclusive, of component (B);
- from 15–90% by weight, inclusive, of component (A); from 10–85% by weight, inclusive, of component (B);
- from 20–90% by weight, inclusive, of component (A) and from 10–80% by weight, inclusive, of component (B);
- from 30–90% by weight, inclusive, of component (A) and from 10–70% by weight, inclusive, of component (B); and In an especially preferred mixture, component (B) is a mixture of dyes (B).

Mixtures embodying the invention can be prepared by merely mixing the individual dyes or, in some cases, by synthesis using a mixture of diazotising components. This method is especially suitable when component (B) is at least one dye of the formula (V). The dye mixture may be isolated, for example, by spray drying or salting out.

The mixtures can be used to dye or print on substrates containing a hydroxyl group or nitrogen atom, for example, silk, leather, wool, polyamides, polyurethanes and cellulosic materials, especially cotton.

The mixtures provide excellent properties including resistance to modern peroxide based detergents, fastness to repeat washing, good light fastness, excellent wash-off, good build-up, good compatibility of the dyes with one another and a robustness to process variables.

The reactive dye (A) alone gives a navy shade on cotton and may be mixed with at least one yellow, orange, red or blue reactive dye (B) to give a forest green, navy, brown or black shade.

The mixtures have outstanding properties in comparison with known mixtures, for example CI Reactive Black 5, referred to above, which is often used in a mixture with other dyes as a dulling agent.

Preferred embodiments of the invention will now be described in more detail with reference to the following Examples, in which the numbers assigned to the dyes are those given in Table 2 and all parts are by weight unless otherwise stated. In the Examples, dye A has the formula

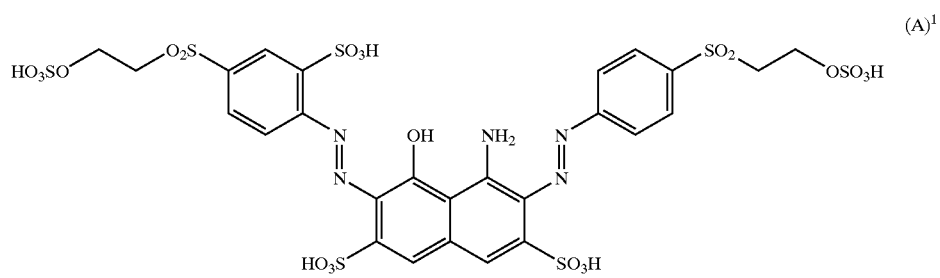

(A)[1]

EXAMPLE 1

75 parts of dye (A)[1], 20 parts of dye (167) and 5 parts of dye (163) were mixed. The mixture was used to dye cotton, by application of cold pad batch and warm exhaust (40, 50 or 60° C.) techniques as described below, in a navy shade resulting in good light fastness and fastness to repeated washing.

Exhaust Application 100 g of cotton fabric were dyed in a dyebath that contained 1000 ml water, 12 g of the mixture of Example 1, 2.5 g sodium carbonate, 1 g 32 weight % sodium hydroxide solution and 60 g sodium sulphate decahydrate. The dyeing was started at 30° C., the temperature was raised to 50° C. over a period of 30 minutes and the dyeing was continued for a further 60 minutes at this temperature. After cooling to room temperature the dyeing was rinsed and boiled with detergent, and dried.

Cold Pad-batch Application

At room temperature woven cotton fabric was soaked in a padder with dye liquor that contained per 1000 g dye liquor 60 g of dye mixture of Example 1, 50 g sodium silicate (38° B'e) and 30 g 32 weight % sodium hydroxide solution. After 70% pick-up the paddings are rolled and covered with cling film. After storing for 8 h at room temperature the paddings are removed from the cling film, rinsed in cold water, hot rinsed with detergent, and dried.

EXAMPLE 2

60 parts of dye (A), 24 parts of dye (44) and 16 parts of dye (105) were mixed mechanically. The dye mixture was applied to cotton using the application and fixing methods of Example 1, resulting in a black shade providing outstanding fastness properties.

EXAMPLE 3

Dye (A)[1] and dye (53) were synthesised separately according to known procedures. 65 parts of reaction solution of dye (A)[1] and 35 parts of reaction solution of dye (53) were mixed and the dye mixture was isolated by spray drying. The dye mixture was applied to cotton using the application and fixing methods of Example 1, resulting in a black shade providing outstanding fastness properties.

Further examples were made achieving the same outstanding fastness properties and these are given in Table 1;

TABLE 1

| Example | Parts dye (A) | Yellow Dye No. | Parts Yellow Dye | Red Dye No. | Parts Red dye | Orange Dye No. | Parts Orange dye |
|---|---|---|---|---|---|---|---|
| 4 | 60 | 10 | 20 | 126 | 20 | | |
| 5 | 58 | 14 | 25 | 127 | 17 | | |
| 6 | 65 | 23 | 14 | 121 | 21 | | |
| 7 | 55 | 44 | 25 | 129 | 20 | | |
| 8 | 70 | 49 | 15 | 91 | 15 | | |
| 9 | 65 | 15 | 10 | 105 | 25 | | |
| 10 | 67 | | | | | 55 | 33 |
| 11 | 62 | | | | | 61 | 38 |
| 12 | 60 | | | | | 69 | 40 |

Still further (binary mixture) examples were made and when applied via the cold pad-batch application method of Example 1 achieved the same outstanding fastness properties, as shown in Table 2.

TABLE 2

| Example | Parts dye (A) | Yellow/Orange Dye No. | Parts Yellow/Orange dye |
|---|---|---|---|
| 15 | 17 | 10 | 4 |
| 16 | 34 | 10 | 7 |
| 17 | 17 | 49 | 3 |
| 18 | 34 | 49 | 6 |
| 19 | 17 | 44 | 3 |
| 20 | 34 | 44 | 6 |
| 21 | 17 | 23 | 7 |
| 22 | 34 | 23 | 14 |
| 23 | 17 | 61 | 3 |
| 24 | 34 | 61 | 6 |
| 25 | 17 | 53 | 2.4 |
| 26 | 34 | 53 | 6 |
| 27 | 17 | 67 | 3 |
| 28 | 34 | 67 | 6 |
| 29 | 17 | 85A | 2 |
| 30 | 34 | 85A | 4 |
| 31 | 17 | 85B | 3 |
| 32 | 34 | 85B | 6 |

EXAMPLE 13

100 g of cotton fabric was dyed according to the procedures described for Example 1 using 3 g of a dye mixture containing 1.5 g dye (A)[1], 0.6 g dye (1), 0.3 g dye (2) and 0.57 g dye (94) resulting in a brown shade providing outstanding fastness properties.

EXAMPLE 14

100 g of cotton fabric was dyed in a dyebath that contained 1000 ml water, 3 g of a mixture containing 1.4 g dye (A)[1], 0.13 g dye (150), 0.54 g dye (15), 0.30 g dye (69), 0.28 g dye (90) and 0.35 g dye (101), 15 g sodium carbonate and 60 g sodium chloride. Dyeing was started at 40° C., the temperature was raised to 60° C. over a period of 20 minutes and dyeing was continued for a further 60 minutes at this temperature. After cooling to room temperature the dyeing was rinsed and boiled with detergent resulting in a brown shade providing outstanding fastness properties.

For each of the dyes shown in Table 2 below, dye mixtures may be applied according to any of the procedures described in Examples 1 and 14 or by similar application methods Lo achieve outstanding fastness properties.

| No. | Dyes | Colour on cotton |
|---|---|---|
| 1 | (structure) | yellow |
| 2 | (structure) | yellow |
| 3 | (structure) | yellow |

-continued

| No. | Dyes | Colour on cotton |
|---|---|---|
| 4 | (structure) | yellow |
| 5 | (structure) | yellow |
| 6 | (structure) | yellow |
| 7 | (structure) | golden yellow |

-continued
| No. | Dyes | Colour on cotton |
|---|---|---|
| 8 | 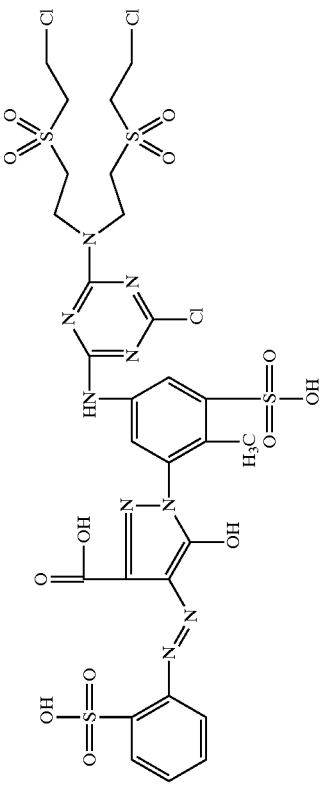 | yellow |
| 9 | 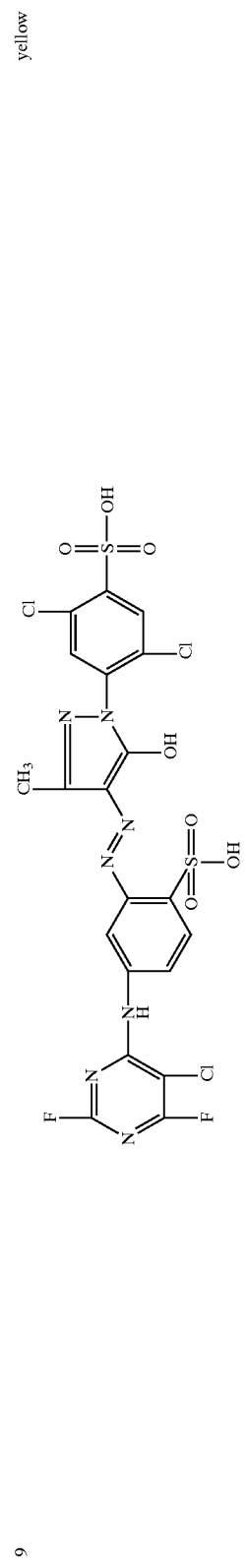 | yellow |
| 10 | 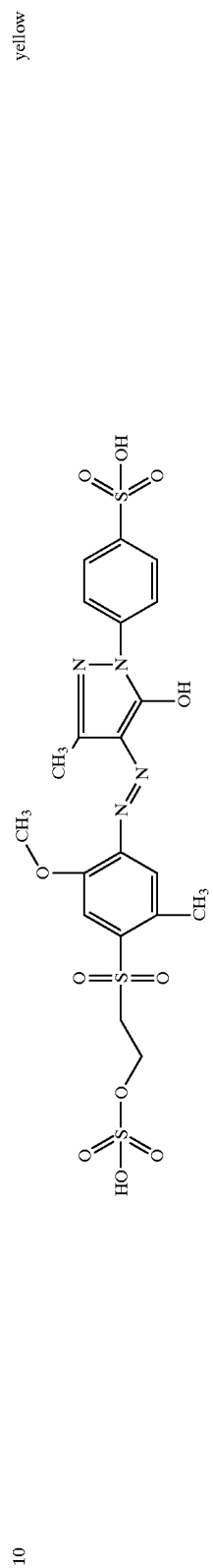 | yellow |

| No. | Dyes | Colour on cotton |
|---|---|---|
| 11 |  | yellow |
| 12 |  | golden yellow |
| 13 |  | golden yellow |

| No. | Dyes | Colour on cotton |
|---|---|---|
| 14 | (structure) | yellow |
| 15 | (structure) | yellow |
| 16 | (structure) | golden yellow |

-continued
| No. | Dyes | Colour on cotton |
|---|---|---|
| 17 | 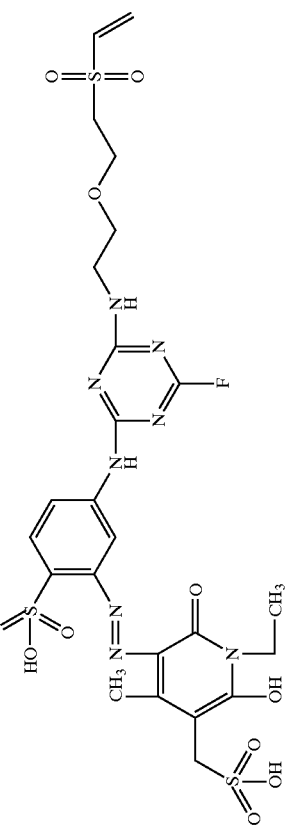 | yellow |
| 18 | 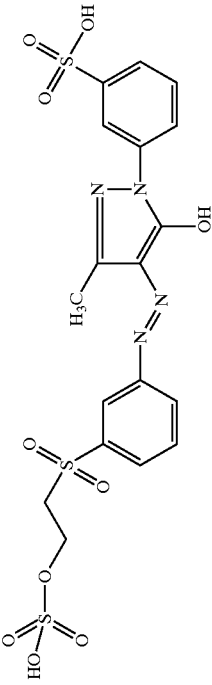 | yellow |
| 19 | 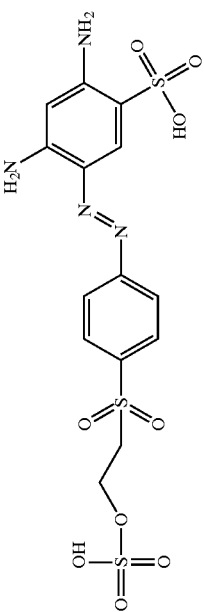 | golden yellow |
| 20 | 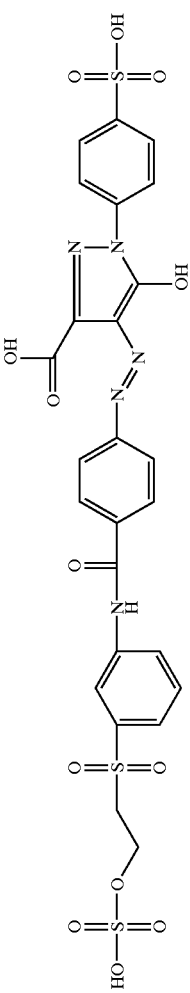 | yellow |

-continued

| No. | Dyes | Colour on cotton |
|---|---|---|
| 21 | (structure) | yellow |
| 22 | (structure) | golden yellow |
| 23 | (structure) | yellow |
| 24 | (structure) | yellow |

-continued

| No. | Dyes | Colour on cotton |
|---|---|---|
| 25 | (structure) | yellow |
| 26 | (structure) | yellow |
| 27 | (structure) | yellow |

-continued

| No. | Dyes | Colour on cotton |
|---|---|---|
| 28 | pyrazole-based azo dye with 4-sulfophenyl, carboxylic acid, methoxy, and 2-(sulfatoethylsulfonyl) groups | yellow |
| 29 | pyrazole-based azo dye with 4-sulfophenyl, carboxylic acid, methoxy, methyl, and 2-(sulfatoethylsulfonyl) groups | golden yellow |
| 30 | naphthalene disulfonic acid azo dye with hydroxy and 3-(2-chlorovinylsulfonyl)phenyl groups | yellow |

-continued

| No. | Dyes | Colour on cotton |
|---|---|---|
| 31 | (structure) | golden yellow |
| 32 | (structure) | golden yellow |
| 33 | (structure) | yellow |

| No. | Dyes | Colour on cotton |
|---|---|---|
| 34 | 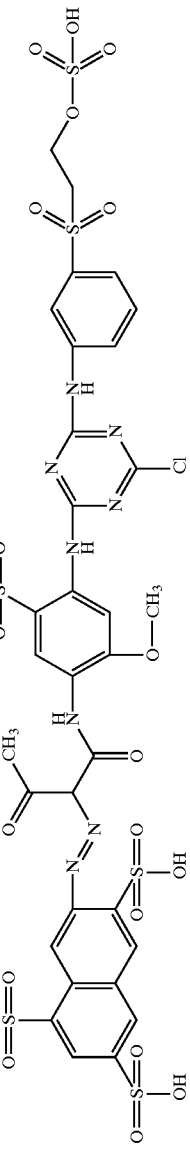 | yellow |
| 35 | 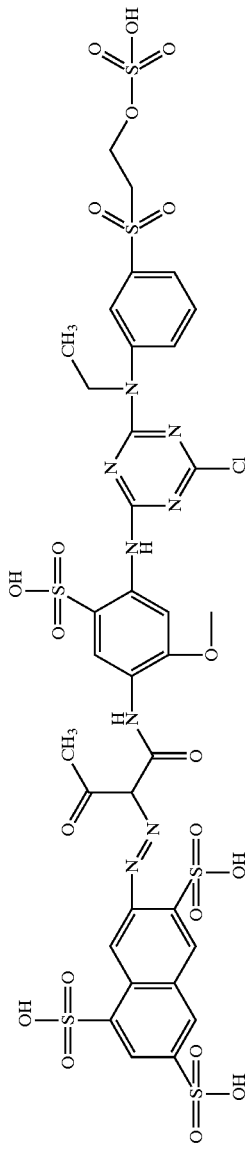 | yellow |
| 36 | 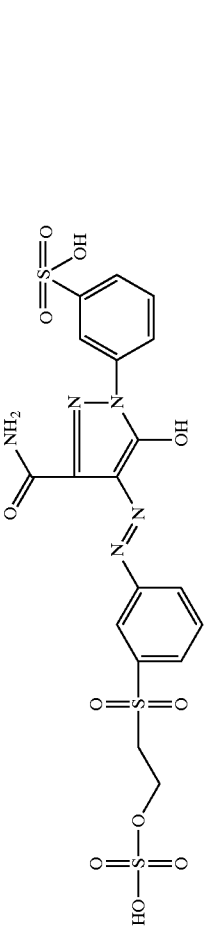 | yellow |
| 37 | 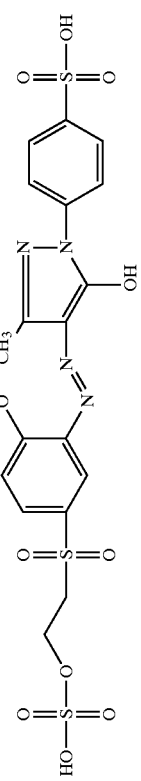 | yellow |

-continued

| No. | Dyes | Colour on cotton |
|---|---|---|
| 38 | (structure) | yellow |
| 39 | (structure) | yellow |
| 40 | (structure) | yellow |

-continued

| No. | Dyes | Colour on cotton |
|-----|------|------------------|
| 41  | (structure) | golden yellow |
| 42  | (structure) | yellow |
| 43  | (structure) | yellow |

-continued

| No. | Dyes | Colour on cotton |
|---|---|---|
| 44 | (structure) | yellow |
| 45 | (structure) | yellow |
| 46 | (structure) | golden yellow |
| 47 | (structure) | yellow |

| No. | Dyes | Colour on cotton |
|---|---|---|
| 48 | 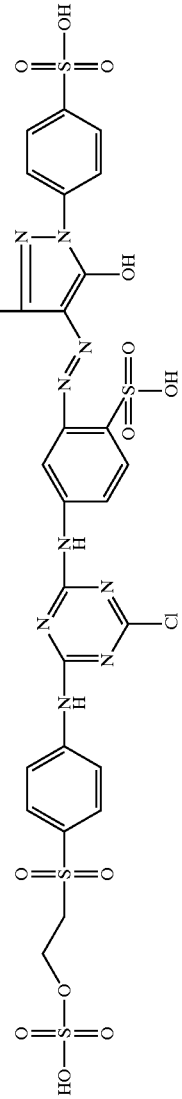 | yellow |
| 49 | | yellow |
| 50 | 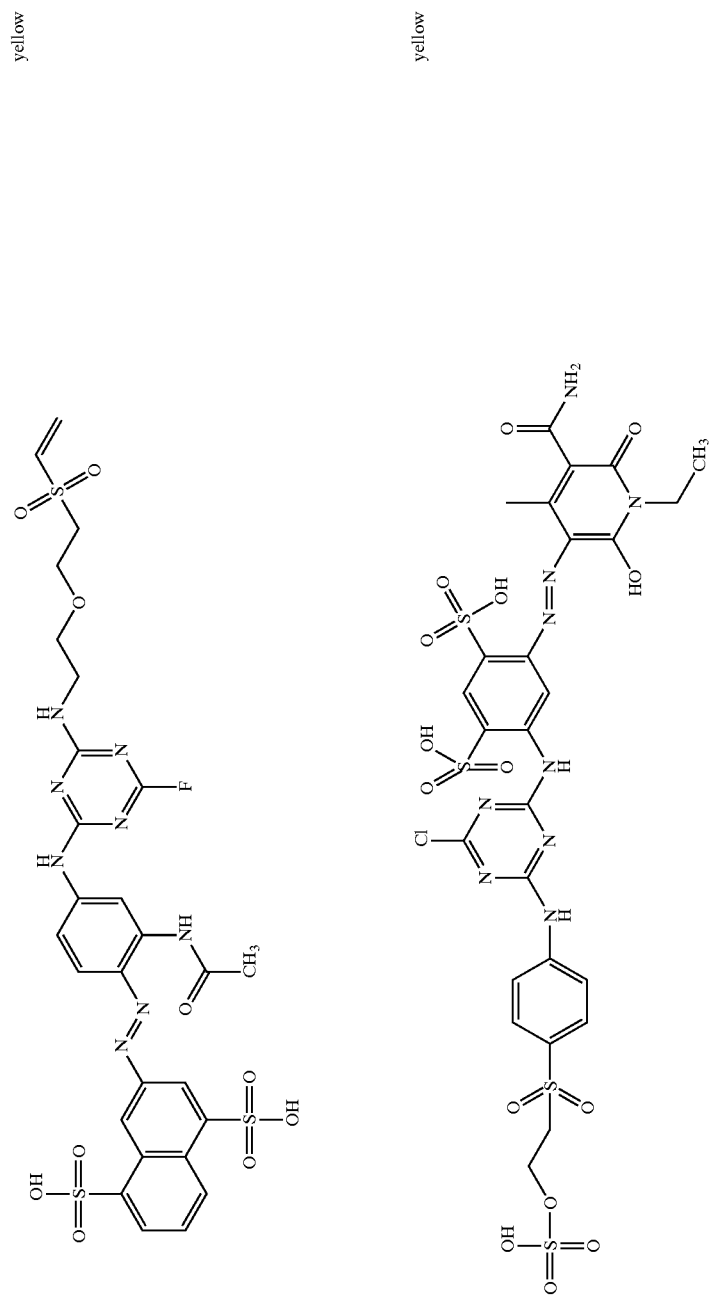 | yellow |

-continued

| No. | Dyes | Colour on cotton |
|---|---|---|
| 51 | | yellow |
| 52 | | orange |
| 53 | | orange |
| 54 | | orange |

| No. | Dyes | Colour on cotton |
|---|---|---|
| 55 |  | orange |
| 56 |  | orange |
| 57 |  | orange |
| 58 |  | orange |

-continued

| No. | Dyes | Colour on cotton |
|---|---|---|
| 59 | | orange |
| 60 | | orange |
| 61 | | orange |
| 62 | | orange |

-continued

| No. | Dyes | Colour on cotton |
|---|---|---|
| 63 | (structure) | orange |
| 64 | (structure) | orange |
| 65 | (structure) | orange |
| 66 | (structure) | orange |

-continued

| No. | Dyes | Colour on cotton |
|---|---|---|
| 67 | (structure) | orange |
| 68 | (structure) | orange |
| 69 | (structure) | orange |

| No. | Dyes | Colour on cotton |
|---|---|---|
| 70 | (structure) | orange |
| 71 | (structure) | orange |
| 72 | (structure) | orange |

-continued

| No. | Dyes | Colour on cotton |
|---|---|---|
| 73 | | orange |
| 74 | | orange |
| 75 | | orange |
| 76 | | orange |

-continued

| No. | Dyes | Colour on cotton |
|---|---|---|
| 77 | | orange |
| 78 | | orange |
| 79 | | orange |
| 80 | | orange |

-continued

| No. | Dyes | Colour on cotton |
|---|---|---|
| 81 | | orange |
| 82 | | orange |
| 83 | | orange |

-continued

| No. | Dyes | Colour on cotton |
|---|---|---|
| 84 | | orange |
| 85 | | orange |
| 85A | | ORANGE |

| No. | Dyes | Colour on cotton |
|---|---|---|
| 85B | 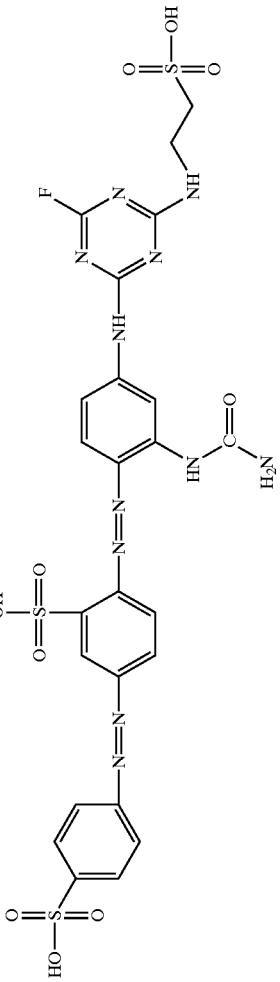 | ORANGE |
| 86 | 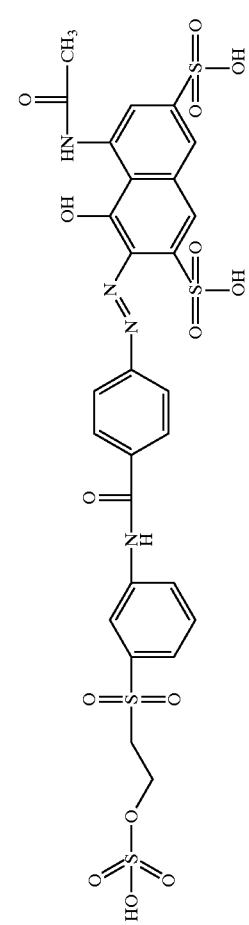 | red |
| 87 | 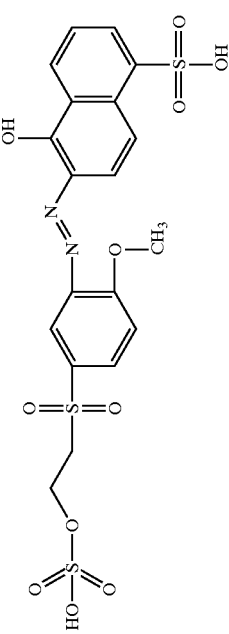 | red |

-continued

| No. | Dyes | Colour on cotton |
|---|---|---|
| 88 | (chemical structure) | red |
| 89 | (chemical structure) | red |
| 90 | (chemical structure) | red |

| No. | Dyes | Colour on cotton |
|---|---|---|
| 91 | (structure) | red |
| 92 | (structure) | red |
| 93 | (structure) | red |

| No. | Dyes | Colour on cotton |
|---|---|---|
| 94 | (structure) | red |
| 95 | (structure) | red |
| 96 | (structure) | red |

| No. | Dyes | Colour on cotton |
|---|---|---|
| 97 | 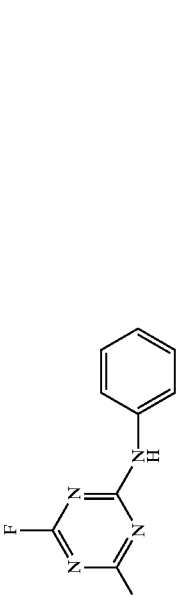 | red |
| 98 | 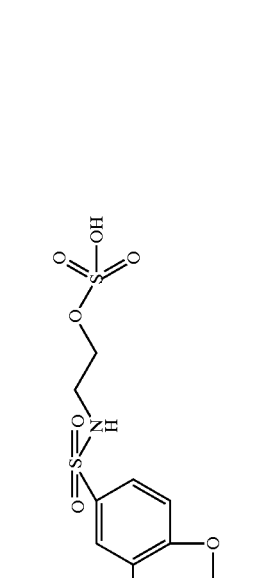 | red |
| 99 | 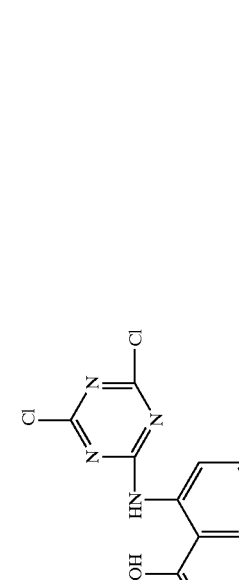 | red |

-continued

| No. | Dyes | Colour on cotton |
|-----|------|------------------|
| 100 | (structure) | red |
| 101 | (structure) | red |
| 102 | (structure) | red |

-continued

| No. | Dyes | Colour on cotton |
|---|---|---|
| 103 | | red |
| 104 | | red |
| 105 | | red |

| No. | Dyes | Colour on cotton |
|---|---|---|
| 106 | (structure) | red |
| 107 | (structure) | red |
| 108 | (structure) | red |

| No. | Dyes | Colour on cotton |
|---|---|---|
| 109 | | red |
| 110 | | red |
| 111 | | red |

| No. | Dyes | Colour on cotton |
|---|---|---|
| 112 | 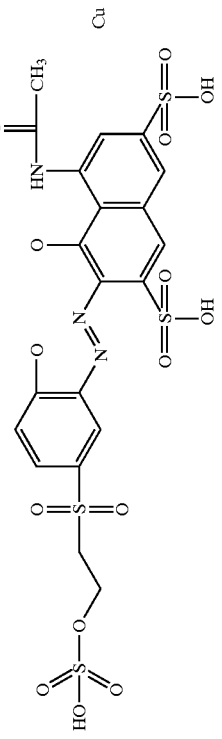 | bluish red |
| 113 | 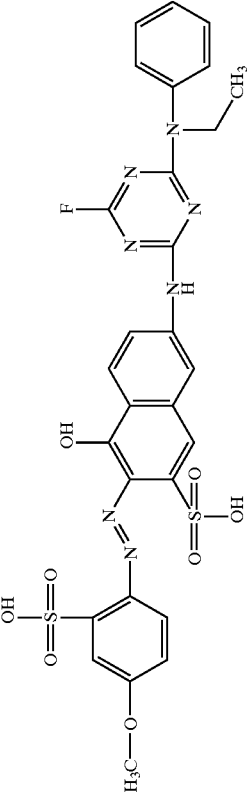 | red |
| 114 | 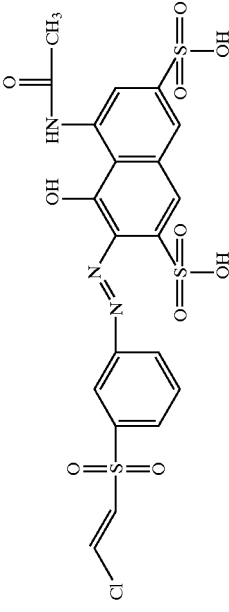 | red |
| 115 | 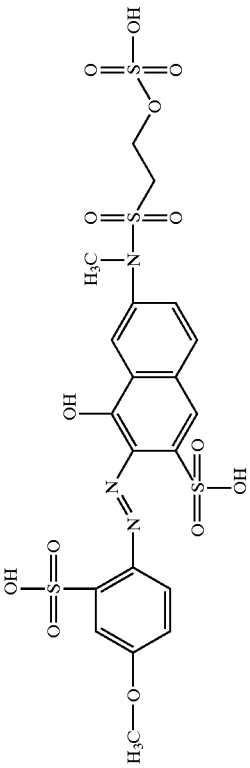 | red |

-continued

| No. | Dyes | Colour on cotton |
|---|---|---|
| 116 | | red |
| 117 | | red |
| 118 | | red |
| 119 | | red |

-continued
| No. | Dyes | Colour on cotton |
|-----|------|------------------|
| 120 |  | red |
| 121 |  | red |
| 122 |  | red |

-continued

| No. | Dyes | Colour on cotton |
|---|---|---|
| 123 | | red |
| 124 | | red |
| 125 | | red |
| 126 | | red |

-continued

| No. | Dyes | Colour on cotton |
|---|---|---|
| 127 | (structure) | red |
| 128 | (structure, Cu complex) | red |
| 129 | (structure) | red |

| No. | Dyes | Colour on cotton |
|---|---|---|
| 130 | (structure) | red |
| 131 | (structure) | red |
| 132 | (structure) | red |

-continued

| No. | Dyes | Colour on cotton |
|---|---|---|
| 133 | | red |
| 134 | | red |
| 135 | | red |

| No. | Dyes | Colour on cotton |
|---|---|---|
| 136 | | red |
| 137 | | red |
| 138 | | red |

| No. | Dyes | Colour on cotton |
|---|---|---|
| 139 | | red |
| 140 | | red |
| 141 | | red |

| No. | Dyes | Colour on cotton |
|---|---|---|
| 142 | (structure) | red |
| 143 | (structure) | red |
| 144 | (structure) | red |

| No. | Dyes | Colour on cotton |
|---|---|---|
| 145 | 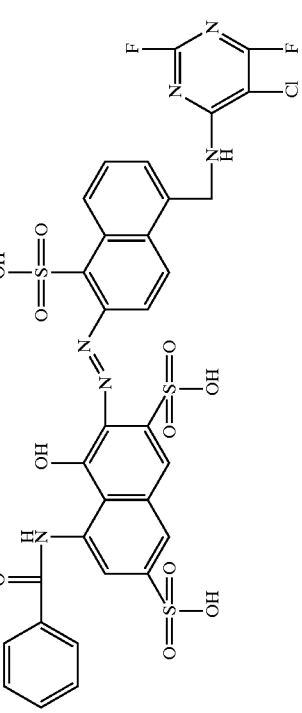 | red |
| 146 | 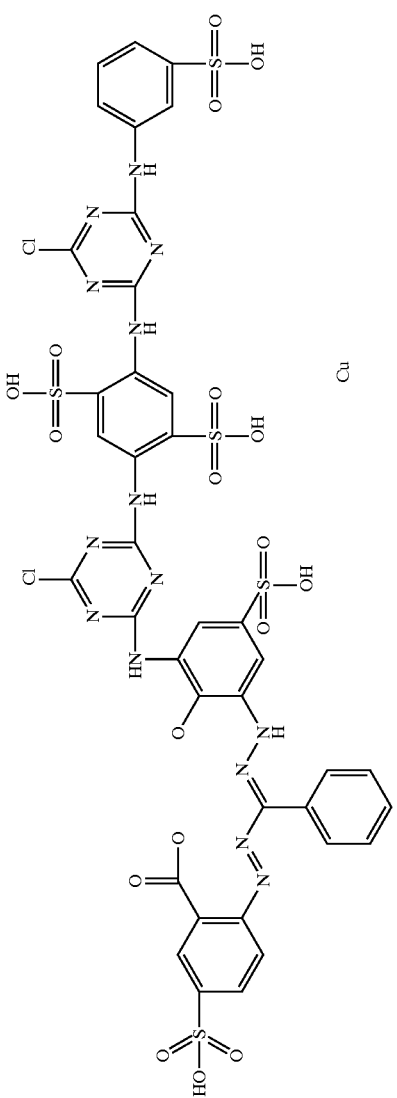 | blue |

-continued
| No. | Dyes | Colour on cotton |
|---|---|---|
| 147 | | turquoise |
| 148 | 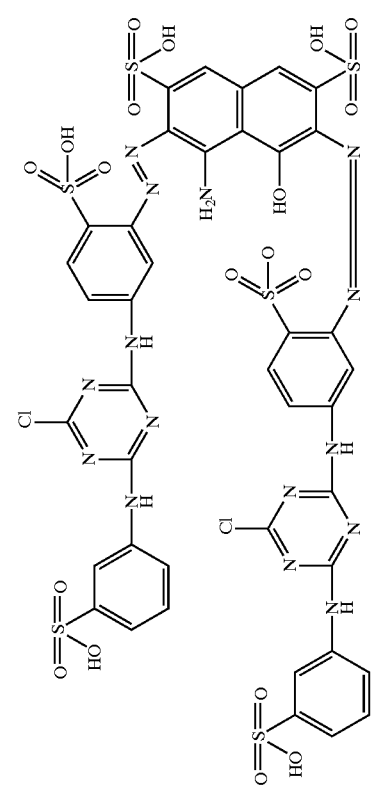 | navy |

| No. | Dyes | Colour on cotton |
|-----|------|------------------|
| 149 | | navy |
| 150 | | blue |
| 151 | | navy |

| No. | Dyes | Colour on cotton |
|---|---|---|
| 152 | 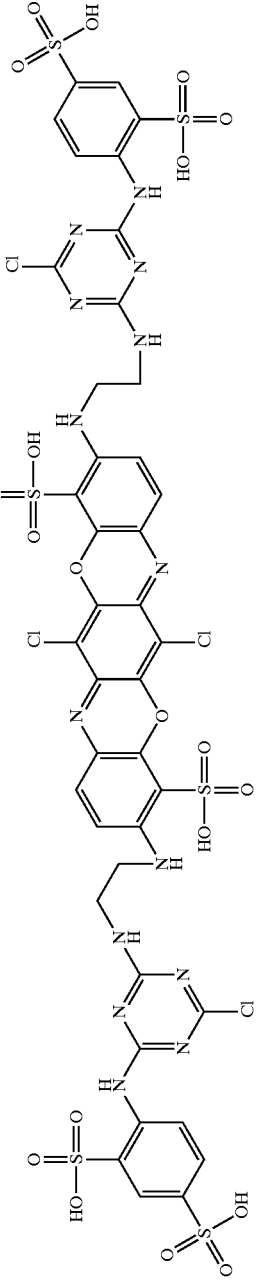 | blue |
| 153 | 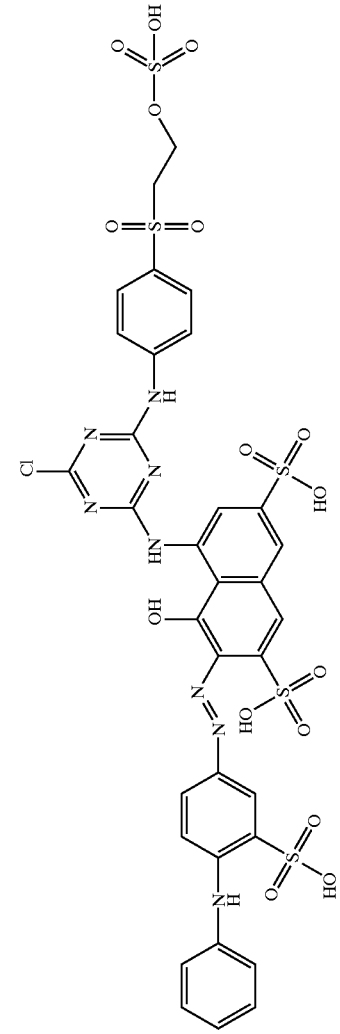 | blue |
| 154 | 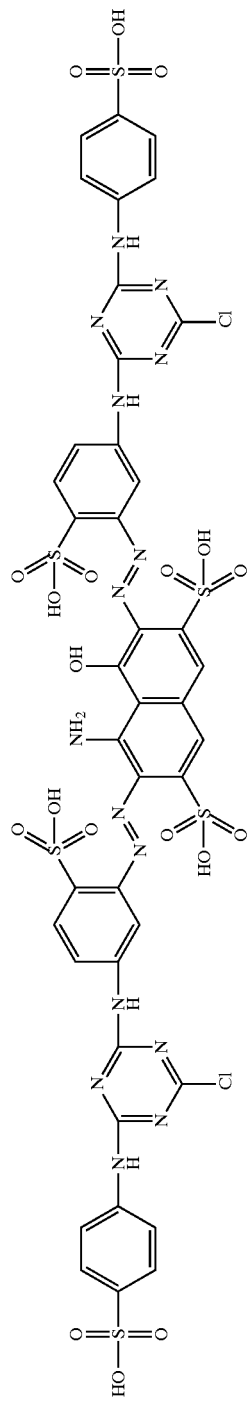 | navy |

-continued

| No. | Dyes | Colour on cotton |
|---|---|---|
| 155 | | navy |
| 156 | | navy |
| 157 | | blue |
| 158 | | navy |

| No. | Dyes | Colour on cotton |
|---|---|---|
| 159 | 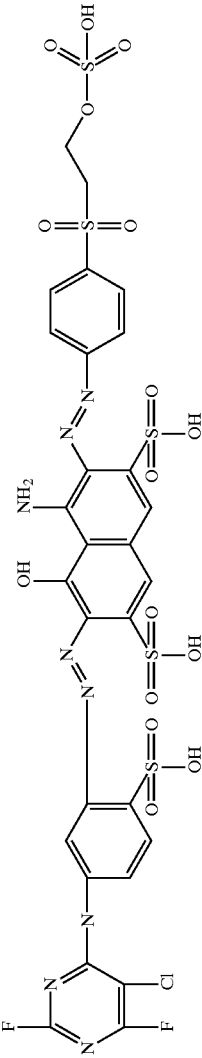 | navy |
| 160 | 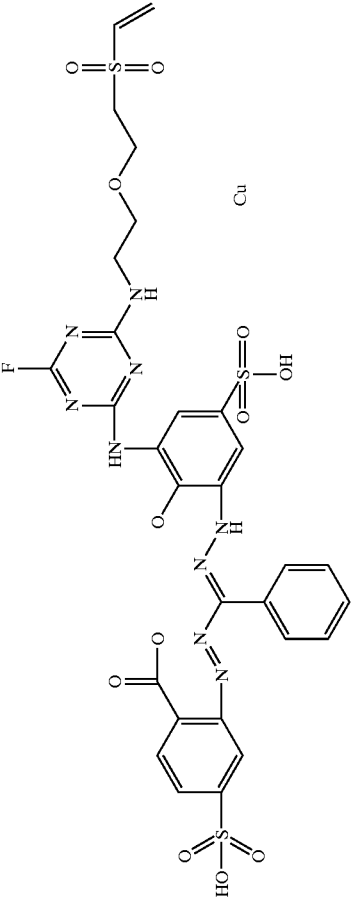 | blue |
| 161 | 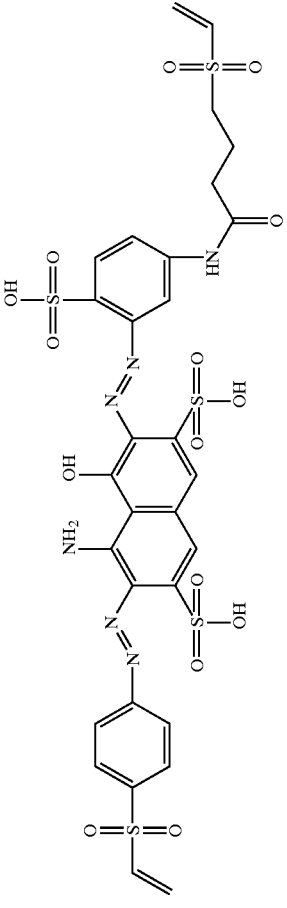 | navy |

-continued
| No. | Dyes | Colour on cotton |
|---|---|---|
| 162 | 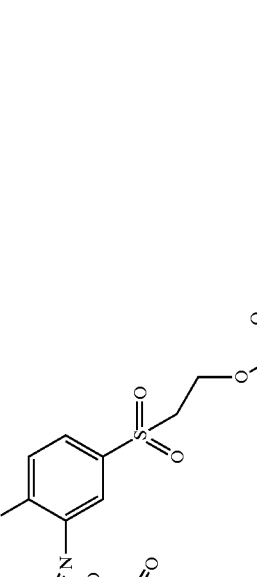 | navy |
| 163 | 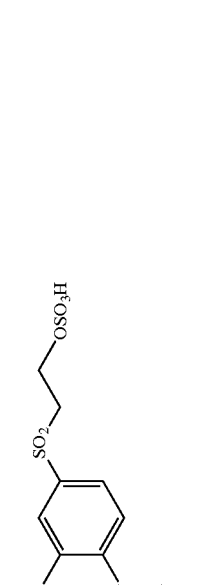 | navy |
| 164 |  | navy |

-continued

| No. | Dyes | Colour on cotton |
|---|---|---|
| 165 | | navy |
| 166 | | navy |
| 167 | | navy |

| No. | Dyes | Colour on cotton |
|---|---|---|
| 168 | 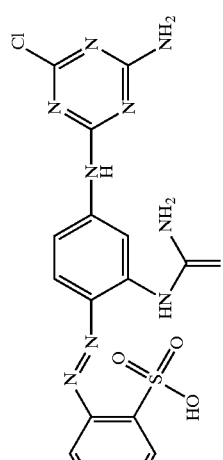 | orange |
| 169 | 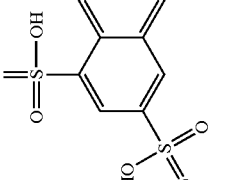 | yellow |

| No. | Dyes | Colour on cotton |
|---|---|---|
| 170 | 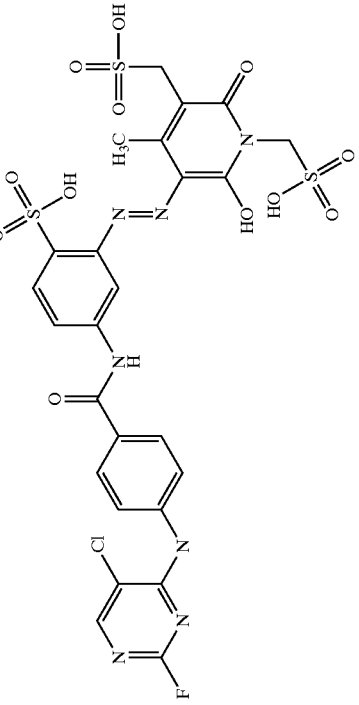 | yellow |
| 171 | 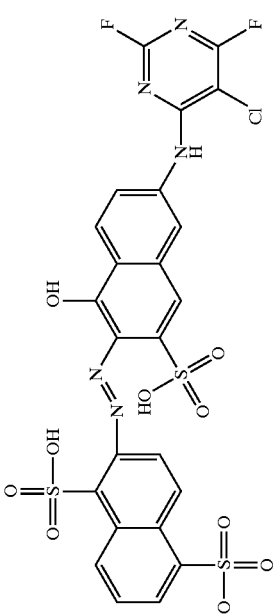 | orange |

What is claimed is:

1. A dye mixture comprising, components A and B, wherein component (A) is a reactive dye of the formula (A)

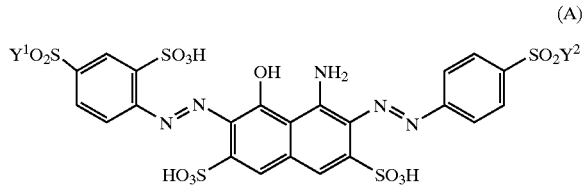

wherein each of $Y^1$ and $Y^2$, independently, is a vinyl group or a group of the formula —$CH_2CH_2Q$ in which Q is a leaving group removable under alkaline conditions to provide a vinyl group; and, component (B) is at least one reactive dye of the formula (V)

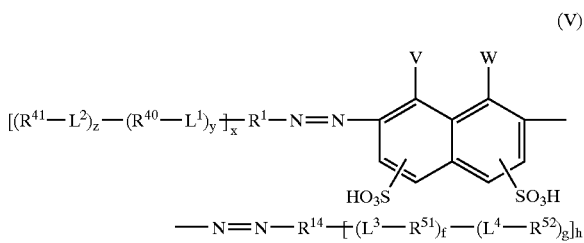

wherein:

$R^1$ is phenyl group optionally having at least one substituent thereon, the substituents, or each substituent independently, being selected from a $C_{1-4}$ alkyl group, a $C_{1-4}$ alkoxy group, a hydroxy group, a carboxyl group, a chlorine atom, a vinyl sulphonyl group, a group $SO_2CH_2CH_2Q^1$ in which $Q^1$ is a leaving group removable under alkaline conditions to provide a vinyl sulphonyl group;

or is a naphthyl group optionally having at least one substituent thereon, the substituents, or each substituent independently, being selected from a sulphonic acid group and a salt thereof, a $C_{1-4}$ alkyl group, a $C_{1-4}$ alkoxy group, a hydroxy group, a carboxyl group, a chlorine atom, a vinyl sulphonyl group, a group $SO_2CH_2CH_2Q^1$ in which $Q^1$ is a leaving group removable under alkaline conditions to provide a vinyl sulphonyl group;

$R^{14}$ is phenyl group optionally having at least one substituent thereon, the substituents, or each substituent independently, being selected from a $C_{1-4}$ alkyl group, a $C_{1-4}$ alkoxy group, a hydroxy group, a vinyl sulphonyl group, a group $SO_2CH_2CH_2Q^1$ in which $Q^1$ is a leaving group removable under alkaline conditions to provide a vinyl sulphonyl group;

or is a naphthyl group optionally having at least one substituent thereon, the substituents, or each substituent independently, being selected from a sulphonic acid group and a salt thereof, a $C_{1-4}$ alkyl group, a $C_{1-4}$ alkoxy group, a hydroxy group, a vinyl sulphonyl group, a group $SO_2CH_2CH_2Q^1$ in which $Q^1$ is a leaving group removable under alkaline conditions to provide a vinyl sulphonyl group;

each of $R^{40}$ and $R^{41}$ independently is an aryl group selected from phenyl and naphthyl groups, each of which, independently, is optionally substituted by a vinyl sulphonyl group, a group $SO_2CH_2CH_2Q^1$ in which $Q_1$ is a leaving group removable under alkaline conditions to provide a vinyl sulphonyl group, or the group Het, where Het is an optionally substituted aromatic heterocyclic reactive or non-reactive group or a reactive or non-reactive group having an aliphatic chain;

each of $R^{51}$ and $R^{52}$ independently is an aryl group selected from phenyl and naphthyl groups each of which is optionally substituted by a vinyl sulphonyl group, a group $SO_2CH_2CH_2Q^i$ in which $Q^i$ is a leaving group removable under alkaline conditions to provide a vinyl sulphonyl group, or the group $Het^3$, where $Het^3$ is an optionally substituted aromatic heterocyclic reactive group or a reactive group having an aliphatic chain;

each of $L^1$, $L^2$, $L^3$ and $L^4$, independently, is a linking group selected from the group consisting of $N(R^{20})$; $C(=O)$; $C(=O)$—O; $S(=O)_2$; $S(=O)$—NH; $C(=O)$—NH; and $NHC(=O)NH$; in which $R^{20}$ is $C_{1-4}$ alkyl or hydrogen;

each of V and W, independently, is $NH_2$ or OH;

each of x, y, z, f, g and h, independently is zero or 1; and at least one of $R^{14}$, $R^{40}$, $R^{41}$, $R^{51}$ and $R^{52}$ is, or has thereon at least one substituent which is reactive.

2. The dye mixture according to claim 1, wherein, in the reactive dye (B) of the formula (V), V is amino, W is hydroxy, each of $R^1$ and $R^{14}$ is a phenyl group substituted by at least one substituent, the or each substituent independently being a vinylsulphonyl group or a group $SO_2CH_2CH_2Q^1$ and $R^{14}$ is optionally additionally substituted by at least one methoxy group.

3. The dye mixture according to claim 1, wherein, in the reactive dye (B) of the formula (V), each of x and h is zero.

4. The dye mixture according to claim 1, wherein, in the reactive dye (B) of the formula (V), at least one of x and h is 1.

5. The dye mixture according to claim 1, wherein, each of x and h is 1.

6. The dye mixture according to claim 2, wherein each of x, y and z is 1, each of $L^1$ and $L^2$ is NH, $R^{40}$ is a triazine ring substituted by a halogen atom and $R^{41}$ is a phenyl group substituted by at lest one substituent, the or each substituent independently being a sulphonic acid group of salt thereof, a vinylsulphonyl group or a group $SO_2CH_2CH_2Q^1$.

7. The dye mixture according to claim 6, wherein each off, g and h is 1, each of $L^3$ and $L^4$ is NH, $R^{51}$ is a triazine ring substituted by a halogen atom and $R^{52}$ is a phenyl group substituted by at least one substituent, the or each substituent independently being selected from a halogen atom, a sulphonic acid group or a salt thereof, a vinylsulphonyl group and a group $SO_2CH_2CH_2Q^1$.

8. The dye mixture according to claim 1, wherein, in the reactive dye (B) of the formula (V), V is amino, W is hydroxy, h is zero and $R^{14}$ is a naphthalene group substituted by at least one sulphonic acid group.

9. The dye mixture according to claim 8, wherein each of x, y and z is 1, $R^1$ is a phenyl group, each of $L^1$ and $L^2$ is NH, $R^{40}$ is a triazine ring substituted by a halogen atom and $R^{41}$ is a phenyl group substituted by at least one substituent, the or each substituent independently being a sulphonic acid group or a salt thereof, a vinylsulphonyl group or a group $SO_2CH_2CH_2Q^1$.

10. The dye mixture according to claim 1, wherein, in the reactive dye (B) of the formula (V), V is amino, W is hydroxy, h is 1, f is zero, g is 1, $L^4$ is NH and $R^{52}$ is the group $Het^3$, where $Het^3$ is a substituted aromatic heterocyclic group.

11. The dye mixture according to claim 10, wherein the group Het³ is a pyrimidinyl group substituted by at least one halogen atom and optionally additionally substituted by methyl group.

12. The dye mixture according to claim 11, wherein x is zero and R¹ is a phenyl group substituted by a vinylsulphonyl group of $SO_2CH_2CH_2Q^1$.

13. The dye mixture according to claim 1, wherein, in the reactive dye (B) of the formula (V), V is amino, W is hydroxy, h is 1, f is zero, g is 1, $L^4$ is NHCO, wherein either the nitrogen or carbon atom thereof is attached to the group $R^{14}$, and $R^{52}$ is the group Het³, where Het³ is a reactive group having an aliphatic chain.

14. The dye mixture according to claim 13, wherein the group Het³ is a vinylsulphonyl group or $SO_2CH_2CH_2Q^1$.

15. The dye mixture according to claim 14, wherein x is zero and R¹ is a phenyl group substituted by a vinylsulphonyl group or $SO_2CH_2CH_2Q^1$.

16. The dye mixture according to claim 1, which contains a dye of the formula (105)

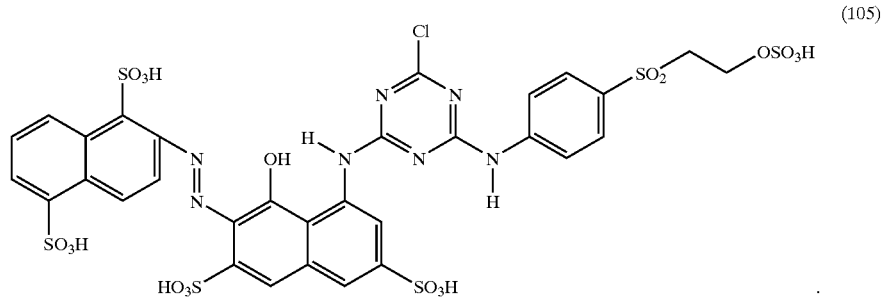

17. The dye mixture according to claim 16, which additionally contains a dye of the formula (44)

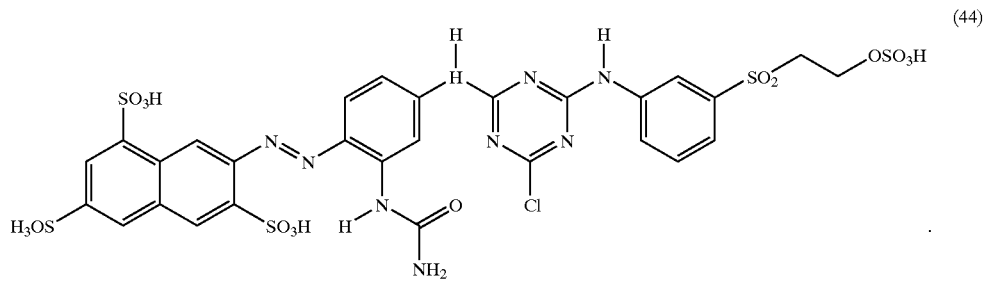

18. The dye mixture according to claim 1, which contains a dye of the formula (167)

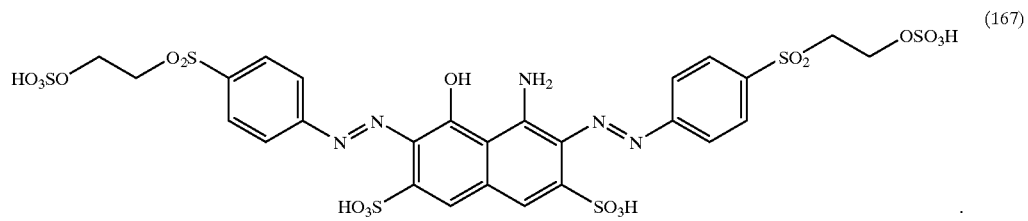

* * * * *

UNITED STATES PATENT AND TRADEMARK OFFICE
CERTIFICATE OF CORRECTION

PATENT NO. : 6,800,099 B2
DATED : October 5, 2004
INVENTOR(S) : Andrea M. Zamponi It is certified that error appears in the above-identified patent and that said Letters Patent is hereby corrected as shown below:

Column 136,
Line 12, "$Q^i$ in which $Q^i$" should read -- $Q^1$ in which $Q^1$ --.
Line 45, "off," should read -- of f, --.

Signed and Sealed this

Eighteenth Day of January, 2005

JON W. DUDAS
*Director of the United States Patent and Trademark Office*